(12) United States Patent
Messinger et al.

(10) Patent No.: US 8,356,910 B2
(45) Date of Patent: Jan. 22, 2013

(54) RECHARGEABLE FLASHLIGHT, BATTERY AND CHARGER ADAPTER AND PROTECTOR THEREFOR

(75) Inventors: Norman A. Messinger, Center Square, PA (US); Thomas D. Boris, Collegeville, PA (US); Lawrence H. Bennett, III, Norristown, PA (US)

(73) Assignee: Streamlight, Inc., Eagleville, PA (US)

(*) Notice: Subject to any disclaimer, the term of this patent is extended or adjusted under 35 U.S.C. 154(b) by 349 days.

(21) Appl. No.: 12/761,728

(22) Filed: Apr. 16, 2010

(65) Prior Publication Data

US 2010/0271814 A1 Oct. 28, 2010

Related U.S. Application Data

(60) Provisional application No. 61/171,596, filed on Apr. 22, 2009.

(51) Int. Cl.
*F21L 4/00* (2006.01)
*H02J 7/00* (2006.01)

(52) U.S. Cl. ......... 362/183; 320/107; 320/113; 320/115

(58) Field of Classification Search .................. 320/107, 320/113–115; 362/183
See application file for complete search history.

(56) References Cited

U.S. PATENT DOCUMENTS

| | | | |
|---|---|---|---|
| 3,221,245 A | 11/1965 | Allerton | |
| 3,969,148 A | 7/1976 | Trattner | |
| 4,092,580 A * | 5/1978 | Prinsze | 320/115 |
| 4,282,562 A * | 8/1981 | Marino | 362/183 |
| RE31,458 E | 12/1983 | Trattner | |
| 5,432,689 A | 7/1995 | Sharrah | |
| 5,486,432 A | 1/1996 | Sharrah | |
| 5,633,574 A | 5/1997 | Sage | |
| 6,046,572 A | 4/2000 | Matthews et al. | |
| 6,099,147 A | 8/2000 | Ziegenfuss | |
| 6,104,162 A | 8/2000 | Sainsbury | |
| 6,357,534 B1 | 3/2002 | Buetow | |
| 6,461,764 B1 | 10/2002 | Nakamura | |
| 6,569,555 B1 | 5/2003 | Faris | |
| 6,585,391 B1 | 7/2003 | Koch | |
| 6,633,152 B2 | 10/2003 | Sharrah | |
| 6,762,584 B2 * | 7/2004 | Harvey | 320/107 |
| 7,220,013 B2 | 5/2007 | Sharrah | |
| 7,393,120 B2 | 7/2008 | Kang | |
| 7,466,082 B1 | 12/2008 | Snyder | |
| 7,579,782 B2 | 8/2009 | West | |
| 7,609,005 B2 | 10/2009 | West | |
| 7,674,003 B2 | 3/2010 | Sharrah | |
| 7,723,921 B2 | 5/2010 | West | |

(Continued)

OTHER PUBLICATIONS

US Patent & Trademark Office, "Office Action", U.S. Appl. No. 11/751,606, Mar. 17, 2010, 15 pages.

(Continued)

*Primary Examiner* — M'Baye Diao
(74) *Attorney, Agent, or Firm* — Clement A. Berard, Esq.; Dann, Dorfman, Herrell & Skillman, PC

(57) ABSTRACT

An adapter for replacing an original battery, light or battery powered device utilizing a battery of a first type with a replacement battery light or battery powered device utilizing a battery of a second and different type may comprise first terminals configured similarly to terminals of an original battery, light or battery powered device, second terminals for connecting to a replacement battery, light or battery powered device, and an electronic circuit for controlling charging of the battery of the replacement battery, light or battery powered device connected to the second terminals when a battery charging device for a battery of the first type is connected to the first terminals.

58 Claims, 7 Drawing Sheets

U.S. PATENT DOCUMENTS

| | | |
|---|---|---|
| 7,891,833 B2 | 2/2011 | Sharrah et al. |
| 2003/0137834 A1 | 7/2003 | Jigamian et al. |
| 2005/0128741 A1 | 6/2005 | Matthews |
| 2005/0280393 A1 | 12/2005 | Feldmann |
| 2006/0039139 A1 | 2/2006 | Maglica |
| 2006/0091852 A1 | 5/2006 | Watson |
| 2007/0064354 A1 | 3/2007 | West |
| 2007/0182368 A1* | 8/2007 | Yang ............................ 320/110 |
| 2007/0253194 A1 | 11/2007 | Sharrah |
| 2009/0284170 A1 | 11/2009 | West |
| 2010/0013394 A1 | 1/2010 | West |
| 2010/0177507 A1 | 7/2010 | West |
| 2010/0219775 A1 | 9/2010 | Maglica |
| 2011/0228521 A1 | 9/2011 | Sharrah et al. |

OTHER PUBLICATIONS

Streamlight, Inc., "Response to Office Action", U.S. Appl. No. 11/751,606, Jul. 19, 2010, 9 pages.

International Search Report and Written Opinion of International Application PCT/US10/31567, dated Jun. 28, 2010.

Pelican Products, "7060 LED Li-ion Rechargeable Battery" photographs, 1 sheet, prior to Apr. 22, 2009.

* cited by examiner

RECHARGEABLE FLASHLIGHT, BATTERY AND CHARGER ADAPTER AND PROTECTOR THEREFOR

This Application claims the benefit of U.S. Provisional Patent Application No. 61/171,596 entitled "Battery Adapter and Protector" filed on Apr. 22, 2009, which is hereby incorporated herein by reference in its entirety.

The present invention relates to adapter circuitry enabling a battery-powered device or a battery of one battery type to be charged and/or recharged using a charging device for a battery-powered device or a battery of a different battery type.

Many electrical devices, including portable lights such as flashlights, employ rechargeable batteries that can be used and reused many times, thereby reducing the cost of having a fully charged and ready for use device. For many years the battery of choice for such devices has been the nickel-cadmium (Ni—Cd) battery which provided good performance at reasonable cost, and which could be recharged hundreds of times. Because the voltage provided by a Ni—Cd battery cell is relatively low, e.g., 0.9-1.2 volts when discharging, plural cells are often connected in series to provide a higher voltage, and it is often convenient to package plural cells together as a plural-cell battery. Ni—Cd cells must typically be charged to about 1.4-1.5 volts to be fully recharged.

An example of such flashlight is the STINGER® flashlight which has been available from Streamlight, Inc. of Eagleville, Pa., USA for over ten years. The STINGER® flashlight employs a Ni—Cd battery which includes plural Ni—Cd cells in series connection in a cylindrical battery assembly that slips into the housing of the STINGER® flashlight and that is retained therein by a tail cap that is screwed in place in the tail end of the flashlight housing. The STINGER® flashlight battery has three Ni—Cd battery cells that are packaged in a cylindrical outer sheath and has a central contact and an annular contact on one end thereof for making contact with two concentric and coaxial spring contacts inside the housing of the STINGER® flashlight.

One example of a Ni—Cd battery is shown and described in U.S. Pat. No. 5,486,432 entitled "Battery Assembly" issued on Jan. 23, 1996 to R. L. Sharrah et al, which is hereby incorporated herein by reference in its entirety.

One example of a device that may employ a Ni—Cd battery is a STINGER® flashlight and charger system as shown in U.S. Pat. No. 5,432,689 entitled "Flashlight and Recharging System Therefor" issued on Jul. 11, 1995 to R. L. Sharrah et al, which is hereby incorporated herein by reference in its entirety.

Ni—Cd batteries contain cadmium which can be hazardous and can be considered toxic and environmentally undesirable, and the disposal of such batteries is restricted. As a result, it is possible that the use of Ni—Cd batteries may be restricted or even prohibited by law, which could render many serviceable devices inoperable because replacement Ni—Cd batteries would not be available.

Recently, however, batteries employing different materials that provide improved performance and/or lesser potential hazards and environmental concerns have become available. One such battery is known as a Lithium-Ion (Li-ion) battery which advantageously provides greater electrical output per unit of size and weight. Thus, a Li-ion battery is smaller than is a Ni—Cd battery of equivalent capacity. However, a protection circuit is recommended for safely charging a rechargeable Li-ion battery that is not required for a Ni—Cd battery. In addition, standard cell sizes typically differ between Ni—Cd and Li-Ion cells and batteries.

In addition, different charging devices are employed for Ni—Cd batteries than are employed for Li-Ion batteries owing to their different electro-chemical characteristics, e.g., end-of-charge voltages, charging current profiles, fast-charging methods, and the like. For example, a Li-Ion-ion battery typically provides about 3-4 volts when discharging and reaches about 4.2 volts when being recharged. A Li-Ion battery cannot be safely charged by a charger for a Ni—Cd battery without risking damage and/or failure of the Li-Ion battery and the protection circuit internal to some Li-Ion batteries is understood to only protect against unsafe dangerous over-charging, and is not for providing charge limiting and/or charge cut-off.

One example of a Li-Ion battery powered device is a STRION® flashlight and charger system as shown in U.S. Pat. No. 7,220,013 entitled "Rechargeable Flashlight and Battery Assembly For Single-Handed Intermittent and Continuous Operation" issued on May 22, 2007 to R. L. Sharrah et al, which is hereby incorporated herein by reference in its entirety.

A charger for a Ni—Cd battery typically limits the charging current, which can be thought of as a series resistance within the charger. The combination of the voltage provided by charger and the equivalent resistance thereof limits charging current and also reduces the charging current as the Ni—Cd battery voltage increases as it approaches full charge. Because the charging current tapers off, this method of charging is known as taper charging. While the charging current reduces to a lower level when the Ni—Cd battery is fully charged, charging thereafter continues at a low current level as long as the Ni—Cd battery remains in the charger. While Ni—Cd batteries are not harmed by this continuous low-level over-charging, Li-Ion batteries could be harmed thereby. Further, Ni—Cd batteries are typically charged to about 1.5 volts per cell, and so a three-cell Ni—Cd battery would be charged to about 4.5 volts, which is too high for a Li-Ion battery which would be charged to only about 4.2 volts.

As a result, chargers for Ni—Cd batteries cannot be used directly for safely charging Li-Ion batteries, due to differences in end-of-charge voltage and in tolerance of overcharging. In addition, because of these differing electrical and mechanical characteristics, Li-ion batteries cannot simply be substituted for Ni—Cd batteries and Li-ion batteries cannot be safely charged by battery chargers for Ni—Cd batteries.

A Li-Ion battery may be used in place of a Ni—Cd battery, either adapted as a replacement battery or in a portable device. It would be desirable to have circuitry for protecting the Li-Ion battery, particularly when charging the Li-ion battery, whether the circuitry is employed in an adapter for a replacement Li-ion battery or is employed in a replacement or original portable device that can be recharged from a charging device for Ni—Cd or other kinds of batteries.

Accordingly, there is a need for adapter circuitry and/or an adapter that can enable a battery-powered device or a battery of one battery type, e.g., a Li-Ion battery, to be charged and/or recharged using a charging device for a battery-powered device or a battery of a different battery type, e.g., a Ni—Cd battery or a lead-acid battery.

To this end, an adapter for charging and/or recharging a battery powered device of a first battery type utilizing a charging device for a battery of a second battery type, wherein the first and second battery types are different, may comprise: first terminals in a configuration for electrically connecting to charging terminals of a charging device for a battery of the second battery type; second terminals for electrically connecting to a battery powered device of the first battery type; a housing for supporting the first terminals and the second terminals; and an electronic circuit connected between the first and second terminals for controlling the charging of the battery powered device of the first battery type when the battery powered device is connected to the second terminals and a battery charging device for a battery of the second battery type is connected to the first terminals.

According to another aspect, an adapter for replacing an original battery with a replacement battery of a different type may comprise: a first pair of terminals configured similarly to terminals of an original battery; a second pair of terminals for connecting to a replacement battery; and an electronic circuit for controlling charging of the replacement battery when the replacement battery is connected to the second pair of terminals and a battery charging device is connected to the first pair of terminals.

In a further aspect, an adapter and light powerable by a battery of a first battery type and chargeable and/or rechargeable utilizing a charging device for a battery of a second battery type, wherein the first and second battery types are different, may comprise: a light housing supporting a light source and having a cavity for receiving a battery of the first battery type therein; first terminals on the light housing in a configuration for electrically connecting to charging terminals of a charging device for a battery of the second battery type; second terminals in the cavity of the light housing for electrically connecting to a battery of the first battery type; an electronic circuit disposed in said light housing and connected to the first and second terminals for controlling the charging of the battery of the first battery type connected to the second terminals and a battery charging device for a battery of the second battery type is connected to the first terminals; and a switch for selectively energizing the light source from the battery of the first battery type in the cavity of the light housing.

BRIEF DESCRIPTION OF THE DRAWING

The detailed description of the preferred embodiment(s) will be more easily and better understood when read in conjunction with the FIGURES of the Drawing which include.

Figure 1A:
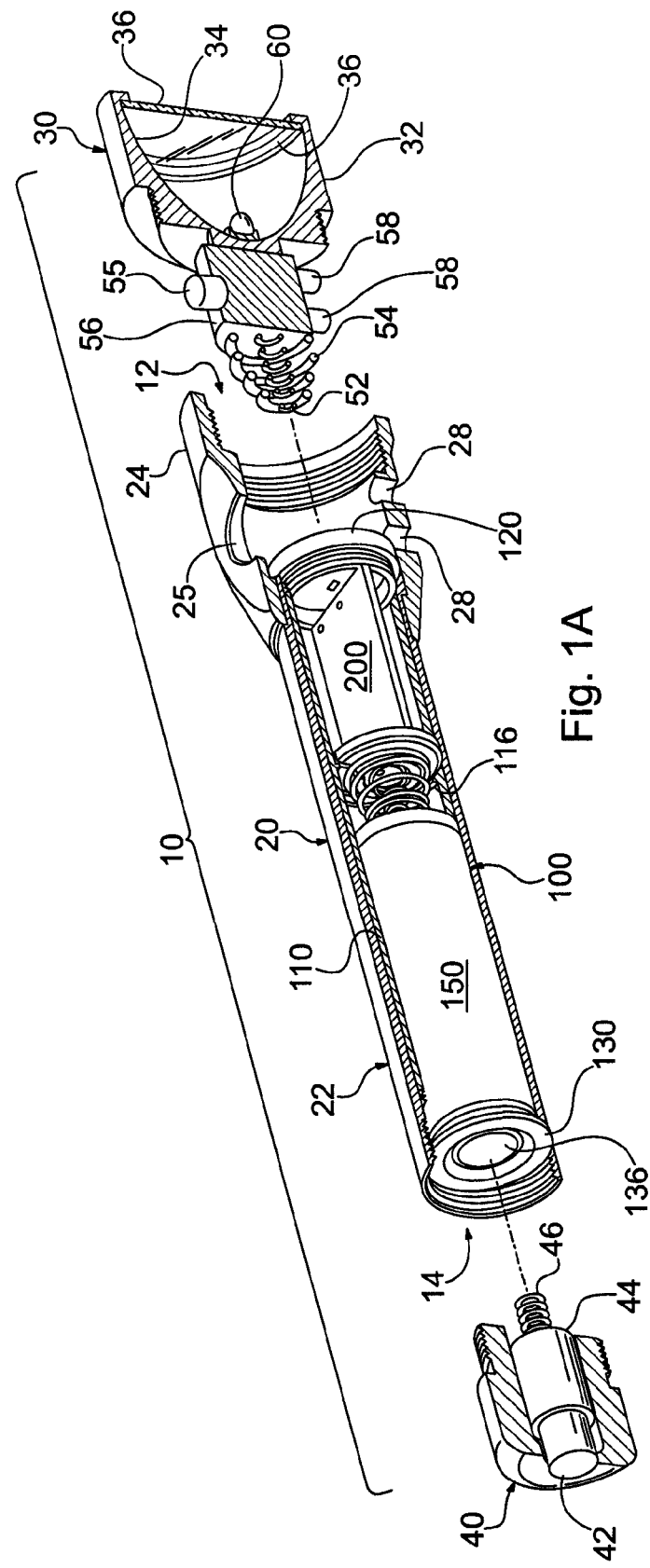
FIG. 1 includes FIGS. 1A and 1B which are cutaway views of example embodiments of a flashlight including an example adapter arrangement.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

Figure 1B:
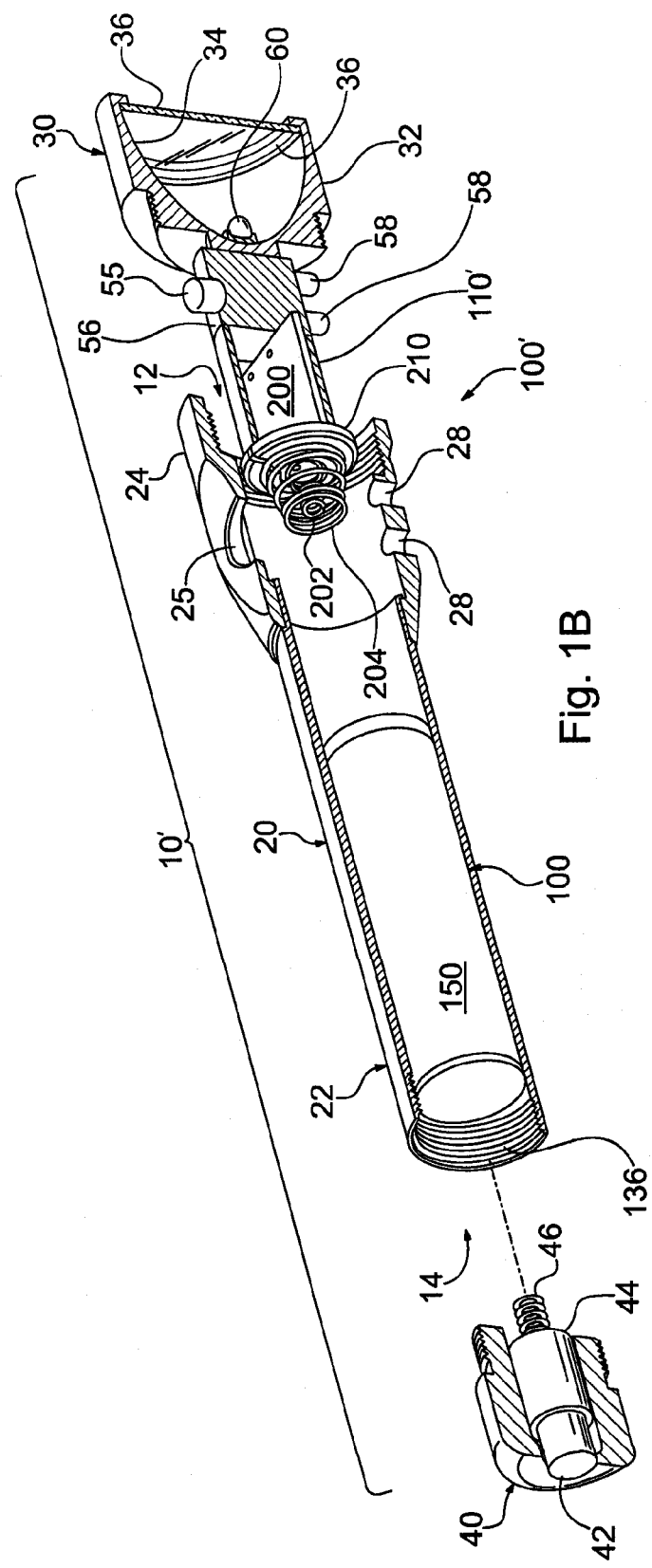
Figure 2:
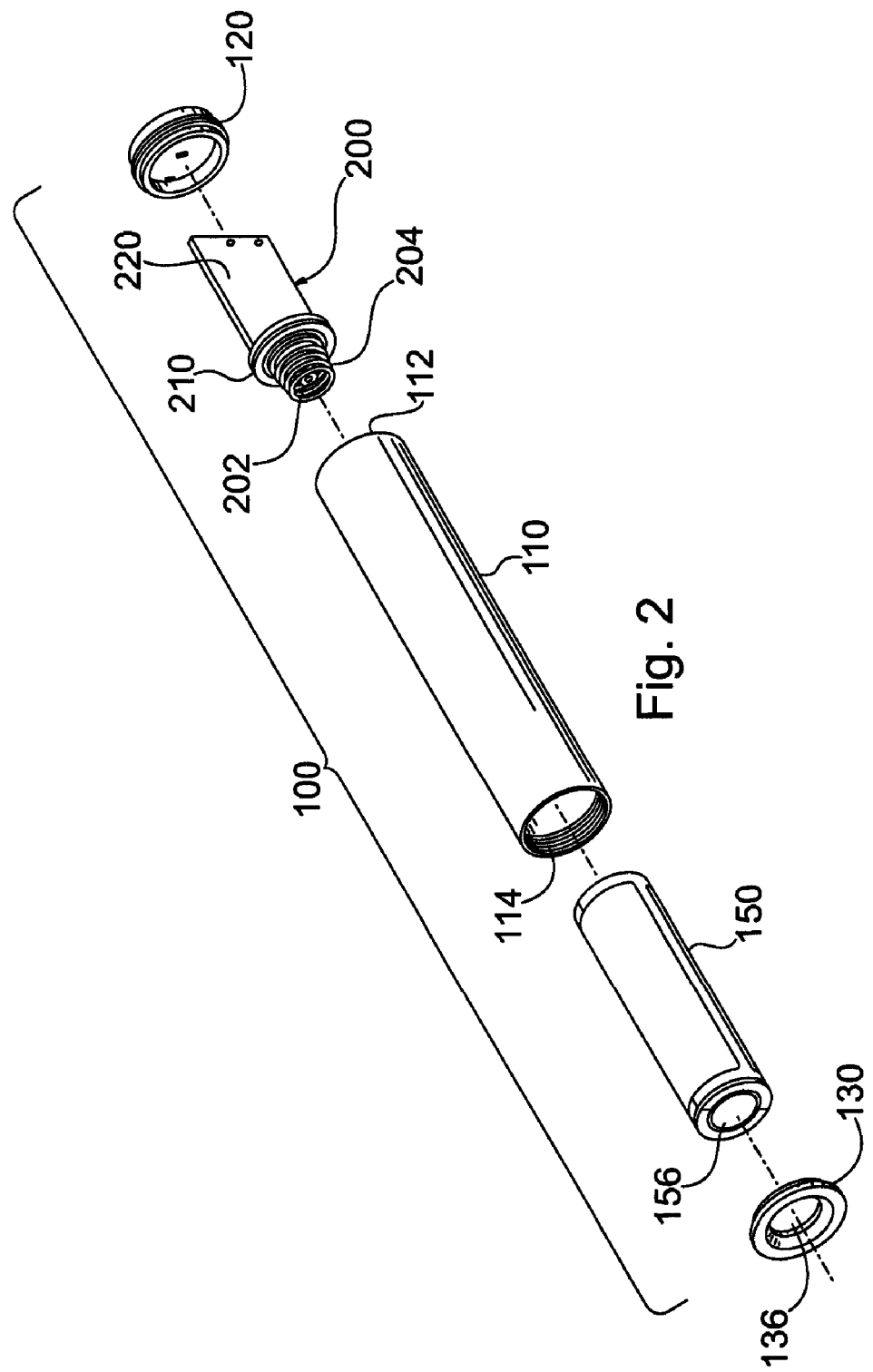
FIG. 2 is an exploded view of one example adapter arrangement of FIG. 1 disposed in a battery adapter assembly.

FIG. 1 includes FIGS. 1A and 1B which are cutaway views of example embodiments of a flashlight 10, 10' including example adapter arrangements 100, 100' and FIG. 2 is an exploded view of the example adapter arrangement 100 of FIG. 1 disposed in a battery adapter assembly. Portable light 10, 10', e.g., flashlight 10, 10', has a head or forward end 12 and a rear or tail end 14, and includes a housing 20 having a cylindrical barrel 22 and head 24 which may, but need not be, of different diameter than the barrel 22. Light 10, 10' also includes a head assembly 30 that threads into or otherwise mates with head 24 of housing 20 and a tail cap or tail assembly 40 that threads into or otherwise mates with the tail end 14 of housing 20. One or more switches 42, 44, 55, 56 are provided for controlling the operation of light 10, 10', e.g., for causing it to produce illumination either momentarily, continuously or periodically, and/or to control the level or intensity of the illumination.

Head 24 typically encloses a head assembly 30 including a light source 60 and reflector 34 and often contains an electronic processor 56 if one is provided or switch module 56 for controlling the operation of flashlight 10, 10'. Head assembly 30 typically includes a body 32 that threads into head 24 of housing 20 and that holds a lens 36 in place relative to reflector 36. Switch module/processor 56 is responsive to a switch 55 that extends into or through opening 25 in housing 20 for being actuated to control operation of light 10, 10' and may include charging contacts 58 that extend through corresponding holes 28 in housing 20 for connecting to a charging device (not shown) for recharging battery 150. The switch module/processor 56 of light 10 preferably connects to electrical contacts 52, 54, e.g., contact springs 52, 54, in a configuration for making electrical connection to the contacts of the original battery and to the contacts of the replacement battery adapter 110, e.g., concentric spring contacts 52, 54 that contact a central contact 122 and a surrounding annular contact 124 of adapter 100 which are visible in FIG. 3.

A tail cap 40 typically threads into the rear or tail end 14 of housing 20 and may include an optional switch 44 operated by an actuator 42, e.g., a push button, for controlling the operation of flashlight 10, 10'. Where electrical contact is to be made to the tail end 136 of battery 150 via adapter 100, tail cap 40 may include an electrical contact spring 46. Flashlight 10, 10' may be controlled by one switch 55 located on the side 25 of housing 20 or by one switch 44 located in the tail cap 40, or may be controlled by two switches 55, 44, one in the side 25 and one in the tail cap 40.

The example light 10 illustrated is similar a STINGER® flashlight available from Streamlight, Inc. The STINGER® flashlight is available in models that have only a side switch, in models that have a tail switch such as the STINGER XT® flashlight, and in a model that has both side and tail switches such as the STINGER DS® LED flashlight. As illustrated, the tail cap, which may contain a switch, and the head assembly, e.g., a light source, reflector and lens, are shown in cross-section.

Flashlight 10, 10' is preferably a rechargeable flashlight 10, 10' and has a physical charger interface on housing 20, e.g., on head 30 of housing 20 of light 10, which includes the external charging contacts 58. An example of a charger interface including two charging contacts 58 may be found in the STINGER® flashlight which has a triangular shaped guide plate on the head thereof in which are located two charging contacts, as described in U.S. Pat. No. 5,432,689 referred to above. The triangular guide plate is received and aligned with the contacts of the charger by a triangular alignment recess of the charger which has two charging contacts therein and the light is gripped and retained in the charger by a pair of jaws thereof, e.g., preferably a pair of spring loaded jaws. The charger interface of light 10 is the same whether light 10 contains its original Ni—Cd battery or a replacement Li-Ion battery 150 with adapter 100, and so either type of battery can be safely charged and/or recharged by the charging device which is provided for charging the light 10 and/or its original Ni—Cd battery.

FIG. 1A illustrates an example flashlight 10 wherein the described battery adapter arrangement 100 is configured as a replacement battery package that is insertable in the light 10 in place of an original battery, e.g., an original battery of another type. FIG. 1B illustrates an example flashlight 10' wherein the described battery adapter arrangement 100' is configured as part of the flashlight 10' and the replacement battery of the different type is directly insertable in the light 10' in place of an original battery, e.g., an original battery of the same type. In both examples, the replacement battery may be recharged by a charging device designed for operation with a battery of a different type and/or a flashlight including a battery of the different type. In one common example, the original battery is a most often a nickel-cadmium (Ni—Cd) battery and the replacement battery is a lithium-ion (Li-Ion) battery, and the battery charging device is intended for charging Ni—Cd batteries and/or flashlights including Ni—Cd batteries.

When the battery adapter arrangement described herein is employed in a battery adapter 100 that is to be inserted into housing 20 of a flashlight that employs an original Ni—Cd battery, it is typically inserted through the tail end 14 thereof and is retained therein by the tail cap that is threaded into the tail end 14 thereof, just as is the original Ni—Cd battery. Battery adapter 100 has concentric electrical contacts on the forward end 120 thereof, e.g., a central electrical contact surrounded by an annular electrical contact, as does the original battery. An example battery adapter 100 for the STINGER® flashlight is generally of the same size and shape and has the same contact (terminal) configuration as the nickel-cadmium (Ni—Cd) battery that is presently employed in the STINGER® flashlight, however, adapter 100 employs a smaller lithium-ion (Li-ion) battery 150 also usable in another flashlight.

Adapter assembly 100 comprises a cylindrical housing 110 that defines a central cavity in which are disposed a circuit board assembly 200 that includes electronic circuitry 220 for interfacing between flashlight 100 and Li-Ion battery 150. Typically, circuit board assembly 200 is located within the forward end 112 of housing 110 by a shoulder or ridge 116 or other projecting feature against which disk 210 is adjacent or abuts. Circuit board 220 is supported between end cap 120 and an insulating disk 210 that supports contacts for connecting to the contacts of battery 150. End cap 120 may have concentric terminals (contacts) on one end thereof including a central contact 122 that is surrounded by an annular (ring) contact 124, e.g., with potential at the central contact 122 being relatively positive and the potential at the ring contact 124 being relatively negative, so as to correspond to the concentric terminal arrangement of the Ni—Cd battery that adapter 100 is intended to replace. Insulating disk 210 supports two concentric and coaxial spring contacts 202, 204 that extend axially for contacting the concentric terminals 152, 154 of Li-Ion battery 150, which are visible in FIG. 3.

For example, a STRION® flashlight available from Streamlight, Inc. employs a single cell Li-Ion battery that is smaller in both length and diameter than is the three cell Ni—Cd STINGER® flashlight battery, but that cannot simply be installed into the STINGER® flashlight and operated, both due to its mechanical differences and its electrical differences. Example battery 150 may have concentric contacts 152, 154 on one end thereof including a central contact 152 that is surrounded by an annular (ring) contact 154, e.g., with potential the central contact 152 being relatively positive and the potential at the ring contact 154 being relatively negative. Thus, the central terminal 152 of battery 150 connects to central concentric and coaxial contact spring 202 and the ring terminal 154 thereof connects to outer concentric and coaxial contact spring 204.

An example Li-Ion-ion battery is described in U.S. Pat. No. 7,220,013 entitled "Rechargeable Flashlight and Battery Assembly for Single-handed Intermittent and Continuous Operation" issued on May 22, 2007 to R. L. Sharrah et al, which is hereby incorporated herein by reference in its entirety.

Where housing 110 is of full length so as to receive Li-Ion battery 150 fully therein as illustrated, a rear end cap 130 is provided for retaining Li-Ion battery 150 in housing 110. Where the wall of housing 110 is of sufficient thickness, threads may be provided at the ends of housing 110 for threadingly engaging end caps 120 and 130, however, end caps 120, 130 may be attached to housing 110 by welding, ultrasonic welding, chemical welding, thermal fusing, adhesive or any other suitable method. Where Li-Ion battery has an exposed terminal 156 at the rearward end thereof, then end cap 130 may have either a central opening 136 through which such rear terminal may be accessed or may have a conductive central terminal 136 that makes electrical contact to the rear terminal 156 of Li-ion battery 150.

Where housing 110 is of less than full length, as may be advantageous where the outer diameter of Li-ion battery 150 is not substantially smaller than the diameter of the Ni—Cd battery that adapter 100 is intended to replace, housing 110 may extend only from end cap 120 to shoulder 116 or a short distance beyond shoulder 116. If helpful to keep Li-Ion battery 150 from being too loose within housing 20 of light 10, housing 110 may extend a short distance, e.g., less than half the length of battery 150, past shoulder 116 or a plastic or cardboard or other suitable sleeve may be employed, to reduce the gap.

In any case, it is preferred that circuit board 200 and disk 210 be retained in a desired position in housing 110, such as by a travel limiting feature, e.g., shoulder 116 on housing 110, and by end cap 120 being secured to end 112 of housing 110. Alternatively, disk 210 could be positioned in housing 110 by adhesive, welding or other suitable means.

Adapter 100 therefore "mimics" the Ni—Cd battery that it replaces by having a terminal arrangement of end cap 120 that substantially replicates the terminal arrangement of the Ni—Cd battery and by having a contact arrangement, e.g., concentric and coaxial springs 202, 204, that substantially replicates the contact arrangement of the light 10 in which battery 150 is intended for use. In addition, adapter 100 preferably also "mimics" certain electrical characteristics of the Ni—Cd battery so as to be compatible with chargers utilized for charging such Ni—Cd battery, as is described below. Further, many Li-Ion batteries also include a safety circuit which can disconnect the Li-Ion cell therein from the battery output terminals if the Li-Ion battery cell experiences an over-voltage, an under-voltage or an over-current condition. The interface provided by adapter 100 must not impede the proper operation of these safety circuit characteristics.

In the portable light 10' of FIG. 1B, example adapter 100' is identical in function and may be different in configuration from the example adapter 100 employed with light 10. For example, circuit board 220 of circuit board assembly 200 of adapter 100' may be connected directly to processor and/or switch module 56 which therefore does not need or have spring contacts like contacts 52, 54 extending from module 56 of light 10. Circuit board 200 may be enclosed within a housing 110' that may have a length similar to that of circuit board 200 and so is shorter than housing 110 described above. Disk 210 and contact springs 202, 204 extending therefrom are as previously described for making electrical contact with the concentric contacts 152, 154 at the forward end of Li-Ion battery 150. Typically, housing 22 of light 10' may be shorter than housing 22 of light 10, e.g., owing to the reduction in length of circuit board 200 and may be of slightly smaller diameter, e.g., owing to the smaller diameter of Li-Ion battery 150. Alternatively, if light 10' employs a housing that was configured for receiving a Ni—Cd battery therein, then adapter housing 100' may be of greater length, as is housing 110, or a sleeve may be provided, so that battery 150 fits properly in housing 22. End cap 130 is also not needed at the end of battery and so may be eliminated.

Further advantage may obtain in adapter 100' and light 10' where the circuitry functions of module 56 and of circuit board 200 may be combined on a common circuit board or circuit assembly, thereby simplifying assembly, increasing reliability and/or reducing cost. Further, such combining of circuit function may also allow the combined circuitry to be provided in a smaller package which can allow of light 10' to be smaller in size, if desired.

Advantageously, light 10' may be provided to preserve mechanical compatibility of the light 10' with a battery charging device intended for use with a light 10, e.g., a light that employs a battery of a different type. Thus, the charger interface of Li-Ion battery powered light 10' preferably has the same mechanical configuration as that of a Ni—Cd battery powered light 10 and may be charged and/or recharged by the same charger. For example, the charging contacts 58 and head 30 of light 10' are in a configuration substantially similar to charging contacts 58 and head 30 of light 10, and so both light 10 and light 10' may be placed into the charging device for light 10 and be charged thereby. This is similar to adapter 100 being provided with a contact configuration substantially similar to that of an original battery to preserve mechanical compatibility for the replacement battery 150 of battery adapter 100 with housing 22 of light 10 and the charging device therefor.

One advantage of the foregoing adapters 100, 100' is that the replacement battery type or replacement energy storage device may be less environmentally hazardous and/or may offer improved performance over the original battery.

Flashlight 10' is preferably a rechargeable flashlight 10' and has a physical charger interface on housing 20, e.g., on head 30 of housing 20 of light 10' which includes the external charging contacts 58. Preferably, the charger interface of light 10' including the two charging contacts 58 is the same physically as the charger interface of light 10 and so light 10' may be placed into and received by the same charger that charges and/or recharges light 10. Thus, light 10' may conveniently be a replacement for original light 10 and may be charged and/or recharged by the charging device provided with light 10.

A suitable charger interface for light 10' may be that of the STINGER® flashlight which has a triangular shaped guide plate on the head thereof in which are located two charging contacts. The triangular guide plate of light 10' may be received and aligned with the contacts of the charging device for light 10 by a triangular alignment recess of that charger which has two charging contacts therein and the light 10' is gripped and retained in the charger by a pair of jaws thereof, e.g., preferably a pair of spring loaded jaws. The charger interface of light 10' is the same as that of light 10 even though light 10' contains a Li-Ion battery 150 because adapter 100, allows Li-Ion battery 150 to be safely charged and/or recharged by the charging device provided for light 10 and its original Ni—Cd battery.

In any case, a user may either replace lights 10 with lights 10' or may replace original batteries for lights 10 with replacement adapter batteries 100, 150 while not having to replace the charging devices therefor. In many instances the charging devices are mounted in buildings or in vehicles and the electrical wiring between such charging devices and a source of electrical power is relatively permanently installed. An example of such installation may be in a police or fire environments where charging devices for tens or even hundreds of lights are permanently mounted to walls, vehicles, or other structure, and where the electrical wiring thereto is also hard wired to an AC supply and/or vehicle power, e.g., in conduit or wire trays, and so are inconvenient and/or expensive to change and/or replace. That expense and inconvenience is avoided where the adapter arrangement describe herein is employed, either by replacing the lights 10 with lights 10' or by replacing original batteries with battery adapters 100 and replacement batteries 150. In addition, original batteries do wear out and/or fail and so periodically need to be replaced, and with the present adapter arrangement, they can be replaced with newer battery types that may provide operating advantages, e.g., longer operating time and/or a greater number of charge/discharge cycles, and may also be more environment friendly.

Figure 3:
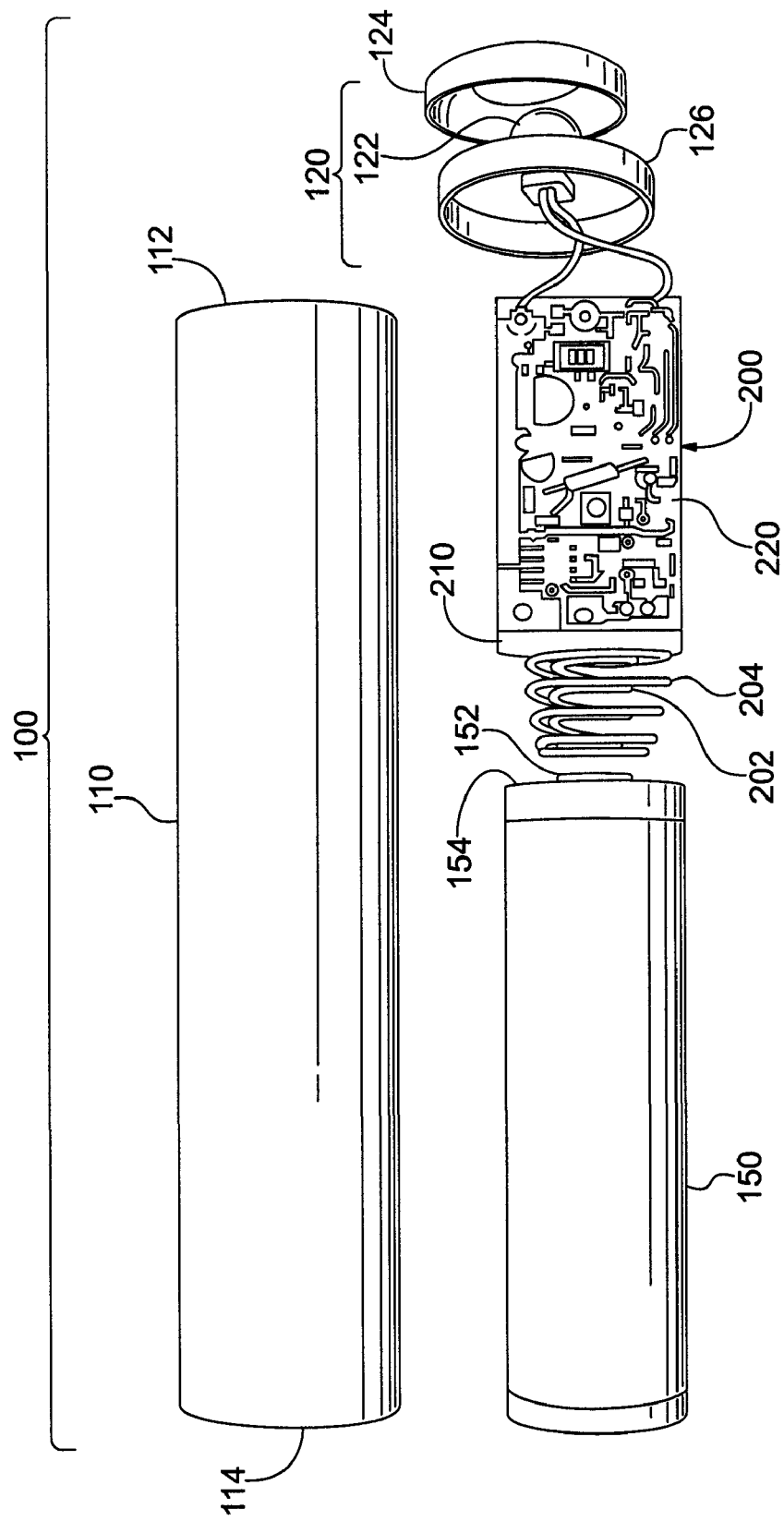
FIG. 3 illustrates details of the battery adapter arrangement shown in FIGS. 1 and 2.

FIG. 3 illustrates details of the battery adapter arrangement of FIGS. 1 and 2. Therein may be seen circuit board 220 having various electronic components thereon for providing a suitable electronic interface between Li-Ion battery 150 and the light 10 and between Li-Ion battery 150 and the charger utilized by the Ni—Cd battery that adapter 100 is intended to replace. Concentric and coaxial springs 202, 204 each have an axially projecting end that extends through a respective hole in insulating disk 210 and that are connected, e.g., soldered, to circuit board 220. End cap 120 is generally a short circular cylinder insulator 126 having a closed end onto which a central terminal 122 and an outer annular terminal 124 are concentrically affixed. Terminals 122, 124 may be connected to circuit board 220 by wires soldered thereto.

Example Li-Ion battery 150 has a central positive terminal 152 and a negative annular terminal 154 that respectively connect to concentric and coaxial contact springs 202, 204 when adapter 100 and battery 150 are assembled, e.g., in housing 110 or in light 10 where housing 110 is of less than full length.

Housing 110 as illustrated is a plastic sleeve of the full length of adapter 100 when adapter 100 is of substantially the same length as the Ni—Cd battery it is intended to replace. While housing 110 may be non-conductive where it is not utilized for providing an electrically conductive path between the rear end 114 and forward end 112 thereof, as in the described example embodiment, housing 110 may be made of a metal, such as aluminum or copper, or of another conductive material where it is desired to employ housing 110 for providing an electrically conductive path between ends 112, 114 thereof; a separate conductor may be provided between end 114 and the forward end, e.g., at or near end 112.

Figure 4:
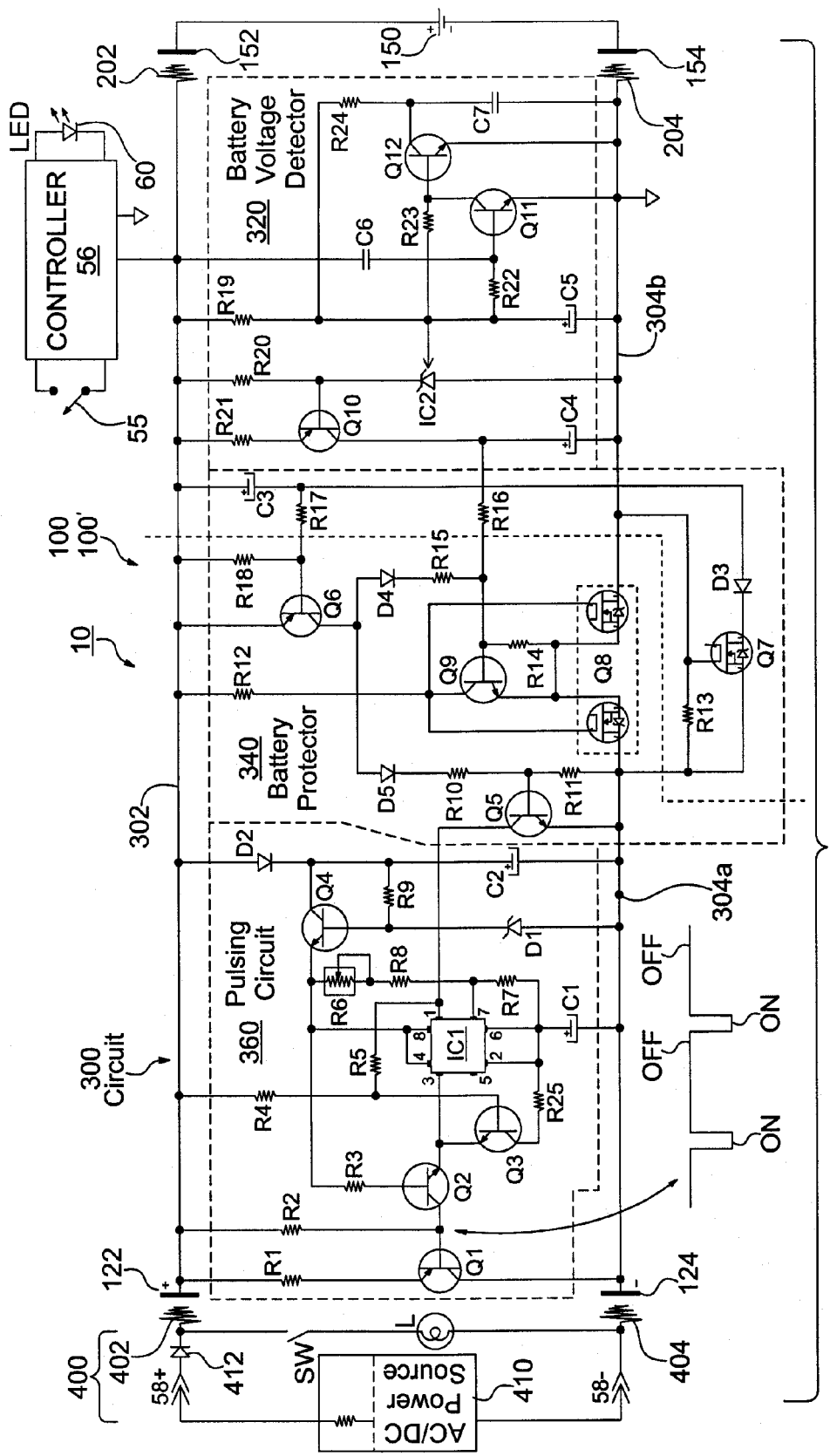
FIG. 4 is an electrical schematic diagram of an example embodiment of the adapter circuitry arrangement.
Figure 5:
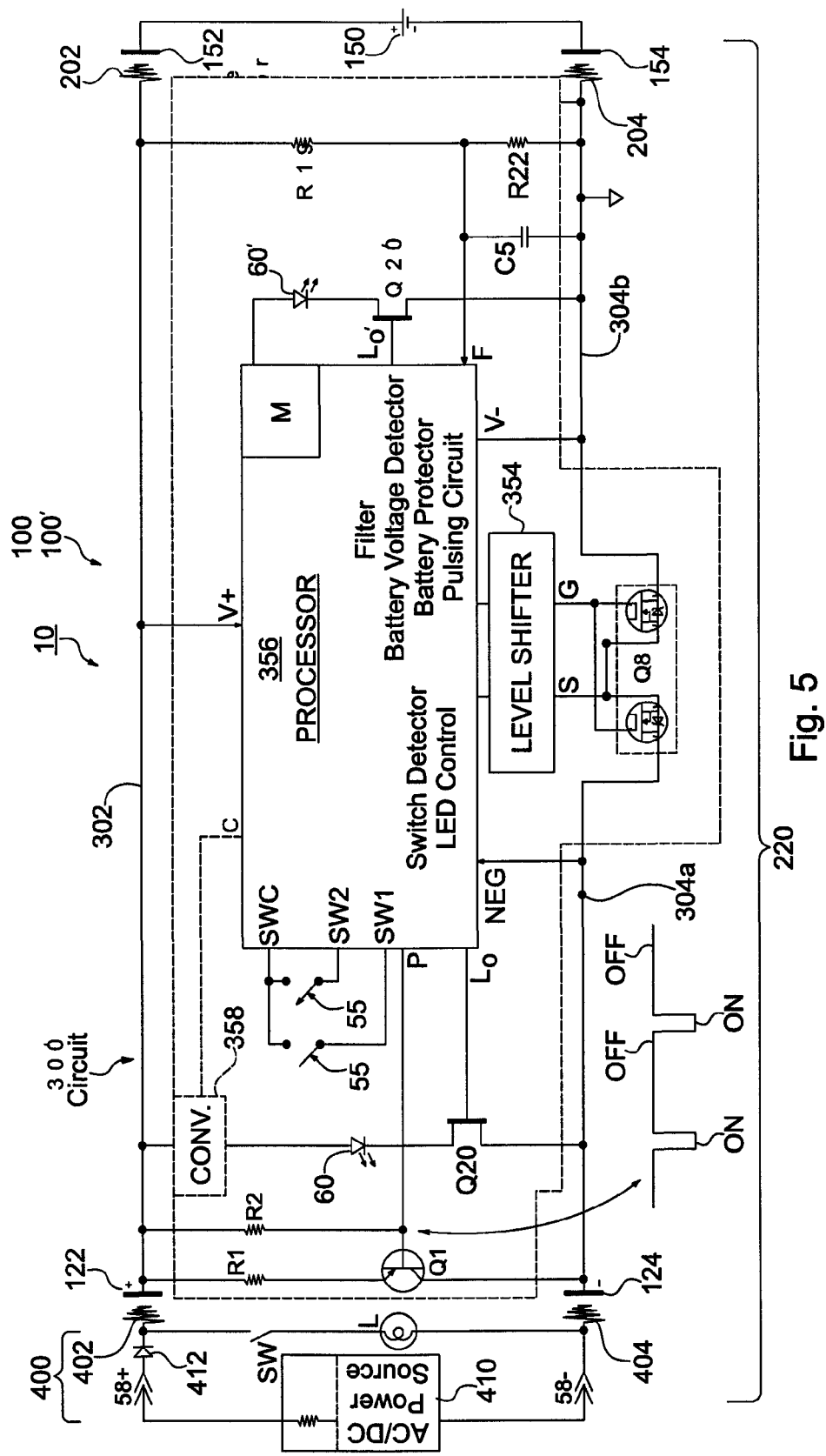
FIG. 5 is an electrical schematic diagram of another example embodiment of the adapter circuitry arrangement.

FIGS. 4 and 5 are electrical schematic diagrams of an example circuitry arrangements of adapter 100, 100' including an electronic circuit 300, 300' that may be located on a circuit board 220 for providing a suitable interface of certain electrical characteristics between Li-Ion battery 150 and a light 10, 10' or charger 400 or other device with which Li-Ion battery 150 is intended to be employed in place of the Ni—Cd battery usable therewith. Adapter 100, 100' in combination with lamp or light source L and switch SW comprise a light 10, 10'.

Electronic circuit 300, 300' includes three main functional parts—a battery voltage detector 320, a battery protector 340 including a series protection element Q8, and a pulsing circuit 360, all of which are typically disposed on circuit board 220. Central terminal 122 and central contact spring 202 connect via a positive+bus 302 while outer ring terminal 124 connects to negative bus 304a and outer spring contact 204 connects to battery negative bus 304b which is connected to bus 304a through a bi-directionally controllable conductivity protection element Q8.

Electronic circuit 300, 300' may be implemented using essentially analog circuits, e.g., as shown in FIG. 4, or using essentially digital circuits, e.g., including a micro-processor or other digital processor 356, e.g., as shown in FIG. 5, for performing the voltage sensing and detection function 320, for controlling a bi-directionally controllable conductivity protection element Q8, and for the pulsing function 360. In any instance, electronic circuit 300, 300' is preferably configured so as to consume very little current when a charger 400 is not connected thereto, e.g., a current drain that drains less than about five percent, and preferably less that three percent of the capacity of battery 150 per month is preferred.

An essentially analog circuit embodiment 300 of electronic circuit 300, 300' is described below in relation to FIG. 4 and is followed by an essentially digital embodiment 300' thereof described in relation to FIGS. 5 and 6. In either embodiment, light 10, 10' may include a light source L, e.g., a lamp L or solid-state light source such as a light-emitting diode (LED), and a switch SW for selectively turning light source L on and off. Alternatively and/or additionally in either embodiment, operation of flashlight 10, 10' may include a controller 56 for selectively energizing LED 60, as such are known in the flashlight art. Controller 56 could be, e.g., a relatively simple circuit responsive to operation of switch 55 to provide OFF, momentary ON and continuous ON operation of LED 60, or could be a controller 56 also providing control or regulation of the current flowing in LED 60, or could be a digital controller/processor 56 also responsive to switch 55 and also providing complex control functions such as dimming and flashing of LED 60, for selectively energizing LED 60, as such are known in the flashlight art. Light 10, 10' may include both a lamp L, e.g., an incandescent lamp, and an LED 60, for providing different levels of light and/or different operating times.

One example of a controller arrangement, e.g., for an LED, is shown and described in U.S. Pat. No. 7,466,082 entitled "Electronic Circuit Reducing and Boosting Voltage for Controlling LED Current" issued on Dec. 16, 2008 to Mark W. Snyder et al, which is hereby incorporated herein by reference in its entirety. Another example of a controller arrangement is shown and described in U.S. Pat. No. 7,674,003 entitled "Flashlight Having Plural Switches and a Controller" issued Mar. 9, 2010 to Raymond L. Sharrah et al, which is hereby incorporated herein by reference in its entirety.

Battery 150 includes terminals 152, 154 as described above, and may include a terminal 156 on the rearward end thereof which is electrically common with one of terminals 152, 154, e.g., negative ring terminal 154, and is not utilized in the present arrangement of electronic circuit 300.

Charger 400 is represented equivalently and includes a source of electrical power 410 which provides either AC or DC voltage which is rectified for application to light 10, 10', and that passes through diode 412 and is provided at contacts 402, 404 internal to a flashlight 10, 10' that includes a light source and a control therefor, shown equivalently as lamp L and switch SW. Contacts 402, 404 of light 10, 10' connect to contacts or terminals 122, 124, respectively of circuit board 220 and circuit 300, 300' of adapter 100, 100'. Charger 400 may include and preferably does include an indicator light (not shown) that indicates whether charger 400 is supplying current, e.g., to a battery being charged. Lamp L of light 10 is normally off because switch SW is open when a light 10, 10' is in place in charger 400 and/or is being charged.

Charger 400 may include electronic circuitry that determines whether charger 400 is supplying charging current and in response thereto controls the illumination of its charging indicator light, as is known. The charging indicator light of charger 400 typically is off when charger 400 is not charging a battery or light, typically is on or flashes when charger 400 is charging a battery or light, and typically flashes (at a different rate) when the battery or light is fully charged. Charger 400 includes the AC or DC charging power source 410 which is what may be referred to as the charger, and may include other provisions such as an indicator, a receptacle to receive light 10, 10' and/or a battery adapter 100 with battery 150 therein, current and/or voltage limiting circuits, and the like as is known for chargers.

Charger 410 for a Ni—Cd battery typically limits the charging current, which is represented schematically by a resistance within charger 410. The combination of the voltage provided by charger 410 and the equivalent resistance thereof limits charging current and also reduces the charging current as the Ni—Cd battery voltage increases as it approaches full charge, e.g., taper charging. This reduced, but continuing, charging current is undesirable for Li-Ion battery 150, as is the Ni—Cd battery end-of-charge voltage of about 4.5 volts because a Li-Ion battery would be charged to only about 4.2 volts.

Circuitry 300, 300' of adapter 100, 100' overcomes this problem so that various chargers for Ni—Cd batteries can be used for safely charging Li-Ion batteries.

In the instance of the example Streamlight STINGER® flashlight, four different types of chargers have been available and supplied over the years of production and remain in use. One type of charger provides a constant DC charging current that is of sufficiently low amperage as to be safe for continuously charging a Ni—Cd battery with full recharge in about ten hours or more. The other chargers provide faster charging typically in about two hours or so by pulsing the charge current and measuring charge current and battery voltage typically in different manners and at different rates. A pulsing type charger typically applies pulses of charging current to the battery for predetermined repetitive periods interleaved with shorter periods of battery discharge, and optionally may also have periods of no current flow when battery voltage is measured. Different pulsing type chargers typically apply pulses of current at different current levels. Pulsing type chargers introduce an AC component on the battery voltage, and the pulsing rates for various chargers is different, both as a result of designed-in differences in the pulsing rate, in the pulsing current and in production tolerances. Chargers for other devices may provide a constant DC charging current until the battery reaches a predetermined voltage and thereafter continues charging with a constant DC voltage at that predetermined voltage while the charging current decreases over time.

In addition, each of these different chargers is operable with a transformer having an AC input of 117 volts and providing an output current of up to 500 milliamperes, with another transformer providing up to 800 milliamperes, and with a direct connection to DC automotive input power at a voltage of about 11-17 volts DC, and typically about 12-14 volts DC. In each instance the electrical characteristic of the charger at its interface with the Ni—Cd battery is different depending upon its type, operation and source of power. Circuitry 300, 300' of adapter 100, 100' is operable with any of these different chargers independently of which source of electrical power is utilized.

When battery 150 is to be charged and is connected to charger 400 via electronic circuit 300, 300' of adapter 100, 100', series element Q8 is at least initially conductive so that charging current flows from charger 400 via positive bus 302 to battery 150 and returns via negative busses 304a, 304b and element Q8. When adapter 100, 100' including circuit 300, 300' and battery 150 are connected to a utilization device such as flashlight 10, 10', current flows in the opposite direction when battery 150 is being discharged. Series element Q8 includes bi-directional FET transistors for passing current in one direction to charge battery 150 and for passing current in the opposite direction when battery 150 is discharged, when element Q8 is conductive. Bidirectional transistor Q8 is a controllable conductivity device whose conductivity is controlled by the potential applied to the gate electrodes thereof. Positive potential applied to the gates of element Q8 turn element Q8 on (render it conductive) and is provided, e.g., via resistor R12 of circuitry 300 or by processor 356 of circuitry 300'.

Voltage detector function 320 and battery protector function 340 operate together as follows: When Li-Ion battery 150 is being charged its terminal voltage increases towards a fully charged voltage as its state of charge increases towards 100% or full charge, which in the case of the example battery 150 herein is about 4.2 volts for a single cell Li-Ion battery. When the voltage of battery 150 reaches 4.2 volts, voltage detector circuit 320 stops the charging thereof by rendering bidirectional element Q8 non-conductive. Thus the charging current does not taper off, but is reduced to essentially zero and no further charging occurs. At this point a typical Li-Ion battery 150 is at about 95% of full charge and this charging regime is believed to increase the number of operating charge-discharge cycles that battery 150 may provide within its useful service life. Voltage detector 320 also functions as a filter for removing the effects of ripple in the current charging Li-Ion battery 150.

Pulsing circuit function 360 operates as follows: It is desirable that the charger 400 indicate whether a battery is being charged and whether the battery has reached the fully recharged condition, which is typically provided by an indicator light that flashes on and off or is on steadily during charging, and is off when no light or battery is connected to charger 400. Optional pulsing circuit 360 introduces a load, e.g., resistance R1, across terminals 402, 404 of charger 410 at a standardized pulse rate, thereby to go from an unloaded state (not charging) to a loaded state (charging) so that the charge indicator light is caused to flash on and off.

Operation of the example essentially analog circuitry 300 embodiment of adapter 100, 100' as shown in FIG. 4 is as follows: When Li-Ion battery 150 is being charged its terminal voltage increases towards a fully charged voltage as its state of charge increases towards 100% or full charge, e.g., about 4.2 volts for a single cell Li-Ion battery. When the voltage of battery 150 reaches 4.2 volts, voltage detector circuit 320 stops the charging thereof in the following manner. Battery voltage is proportioned by voltage divider R19, R22, R23 and is filtered by capacitor C5. The proportioned battery voltage is compared to an internally generated reference voltage by IC2 which is a voltage regulating integrated circuit. When the Li-Ion battery 150 voltage reaches 4.2 volts, the voltage at the arrow input to IC2 reaches 2.5 volts causing IC2 to turn on transistor Q10 which turns on transistor Q9 which in turn pulls the gates of transistors Q8 of battery protector 240 relatively negative thereby to turn transistors Q8 off which ends the flow of charging current therethrough and so charging of battery 150 is limited. With an end-of-charge voltage of 4.2 volts for a single cell Li-Ion battery, recharging to about 95% of full charge is provided which is thought to enhance the reliability and service lifetime of the Li-Ion battery as compared to the life reducing effects of overcharging which could occur if further charging were to be permitted to try to more closely approach a 100% state of charge.

Li-ion batteries can easily be damaged or suffer reduced lifetimes if they are over charged. The conventional charging method is to charge the Li-Ion battery, typically with a constant current or at least a limited current, until a predetermined voltage is reached, after which charging continues at a constant voltage until the charging current tapers off to a low value. The limiting voltage is typically representative of nearly full charge, e.g., about 95% of full charge, with the taper current charging bringing the battery up to 100% charge. However, that could result in undesirable overcharging. Accordingly, battery protector 340 of circuit 300 of adapter 100, 100' preferably operates to avoid that possibility of over charging.

Battery protector 340 preferably then operates to further protect Li-Ion battery 150 as follows. With little or no current flowing to battery 150 once the battery terminal voltage reaches the predetermined value and transistor Q8 becomes non-conductive, the potential at bus 302a tends to increase in a negative direction, e.g., typically to −8 to −10 volts, which causes transistor Q7 of battery protector 340 to turn on and begin to charge capacitor C3. As capacitor C3 charges, transistor Q6 turns on to further drive transistor Q9 on via diode D4 and transistor Q8 off, thereby to ensure that further charging does not occur unless battery 150 is discharged. Thus, battery protector 340 further ensures that charging is terminated even if the battery voltage should decrease slightly due to the removal of charging current. When the discharge of battery 150 becomes needed, e.g., by a load being connected across terminals 122, 124, the voltage at bus 304a decreases to a lower value (less negative potential) that permits transistors Q7 and Q9 to release transistor Q8 to become conductive and the voltage at bus 304b reduces so that voltage detector 320 also releases transistor Q8 to become conductive, so that discharging current can flow from battery 150, e.g., via transistor Q8 and buses 304a, 304b and bus 302. Thus, battery 150 discharges to provide current to the load, e.g., lamp L of light 10 or another device.

Voltage detector 320 also includes circuitry for removing the effects of ripple in the current charging Li-Ion battery 150. Ripple, e.g., an AC variation on the DC charging voltage and current, may be introduced by the pulsing type fast chargers 400 or may be introduced by a charger 400 operating from an AC power source. While transistor Q11 of voltage detector 320 is normally on which holds transistor Q12 off, ripple present on bus 302 is coupled to transistor Q11 via capacitor C6 and varies the conduction of transistor Q11 so that transistor Q12 is rendered conductive thereby so as to connect resistor R24 into the R19, R22, R23 voltage divider to change the division ratio thereof. This reduction in the division ratio slightly alters the battery voltage so that the cut-off of charging is effectively at the desired predetermined voltage, e.g., about 4.2 volts, even though ripple is present.

In addition, and optionally, circuit 300 may include a pulsing circuit 360 for introducing a standardized pulse rate in relation to the various chargers. It is desirable that the charger 400 indicate whether a battery is being charged and whether the battery has reached the fully recharged condition. One way of providing such indication is to provide a light that illuminates when a battery is being charged and that flashes when the battery is fully recharged. Some of the chargers utilized with the STINGER® flashlight provide that feature and some do not; those that do may flash the indicator light at different rates which could be confusing to a user and/or could produce an indefinite indication due to conflicting pulse rates of the various chargers and of adapter 100, 100', which pulsing circuit 360 overcomes.

Typically Ni—Cd battery chargers 400 interpret a no load condition as the absence of their being connected to a battery and turn their charging indicator light off, and they interpret the presence of charging current as indicating that a battery is being or is charged. On the other hand, with a Li-ion battery the zero charging current condition occurs when the Li-ion battery reaches full charge and charge current is cut off, which is interpreted by the Ni—Cd battery chargers as a no-load/no battery condition in which the charging indicator light is off, or at least operates in an indefinite manner, and so the Ni—Cd chargers would falsely indicate no battery present rather than that the Li-Ion battery is fully charged, e.g., by flashing the charging indicator light.

Pulsing circuit 360 resolves those differences and causes chargers 400 to provide a flashing light indication of a fully charged battery, even where the charger does not provide such indication, as follows. Pulsing circuit 360 operates only when battery 150 reaches full charge and voltage detector 320 causes transistor Q6 of battery protector 340 to turn on. Transistor Q6 turning on causes transistor Q5 to turn on via diode D5 which pulls input 1 of oscillator IC1 to the potential of bus 304a thereby to enable IC1 to oscillate.

Pulsing circuit 360 includes an oscillator integrated circuit IC1 that in conjunction with various resistors R4-R8, R25 and capacitor C1 establishes a periodic pulsing, e.g., a "555" type timer integrated circuit configured to provide a pulse output. One example circuit 360 provides a pulse at an about 1 Hertz rate that is low about 10% of the time and that is high about 90% of the time, e.g., low for about 130 milliseconds and high for about 900 milliseconds. The low output turns on synchronizing transistor Q3 which turns on transistor Q2 which in turn turns on transistor Q1 to connect resistor R1 as a load on charger 400, while the high output causes transistors Q1-Q3 to turn off to unload charger 400.

Because all of chargers 400 have some source resistance, the applying of the load of resistor R1 across the charger 400 output is interpreted by the Ni—Cd battery charger 410 as the presence of a battery drawing substantial charge current in response to which Ni—Cd battery charger 410 illuminates its charging indicator light. When the load of resistor R1 is removed, no charge current flows which is interpreted as no battery being present, and Ni—Cd battery charger 410 turns its charging indicator light off. Thus, the pulsed application of load R1 by pulsing circuit 360 when the Li-Ion-ion battery 150 has reached full charge is interpreted by the charger as a light being inserted into and removed from charger 410 at the R1 load pulsing rate, thereby to "trick" the Ni—Cd battery charger 410 into flashing its charging indicator light so as to properly indicate that the Li-Ion battery is fully charged.

Because various chargers 400 operate at different internal rates, e.g., pulse charging rates and/or full-charge indicator flashing rates, pulsing circuit 360 preferably operates a frequency that is slightly higher than the fastest internal rate of chargers 410. As a result, the pulsed loading imposed by resistor R1 preempts the internal rates of chargers 410 and acts to synchronize their charge indicating lights to the rate established by pulsing circuit 360, thereby to tend to set a relatively uniform full charge indicating flashing rate, e.g., about 1 Hertz. The flashing light continues until the adapter 100, 100' including battery 150 is removed from the charger 410 at which time transistors Q5 and Q6 turn off thereby to inhibit operation of IC1 of pulsing circuit 360.

A controlled operating voltage is provided for pulsing circuit 360 by a voltage regulator including Zener diode D1, transistor Q4, resistor R9, diode D2 and capacitor C2. If Zener diode D1 operates at 6.8 volts, then about 6.1 volts is provided to pulsing circuit 360 at the emitter of transistor Q4, thereby substantially reducing the variation from that of the voltage between busses 302 and 304a.

Figure 6:
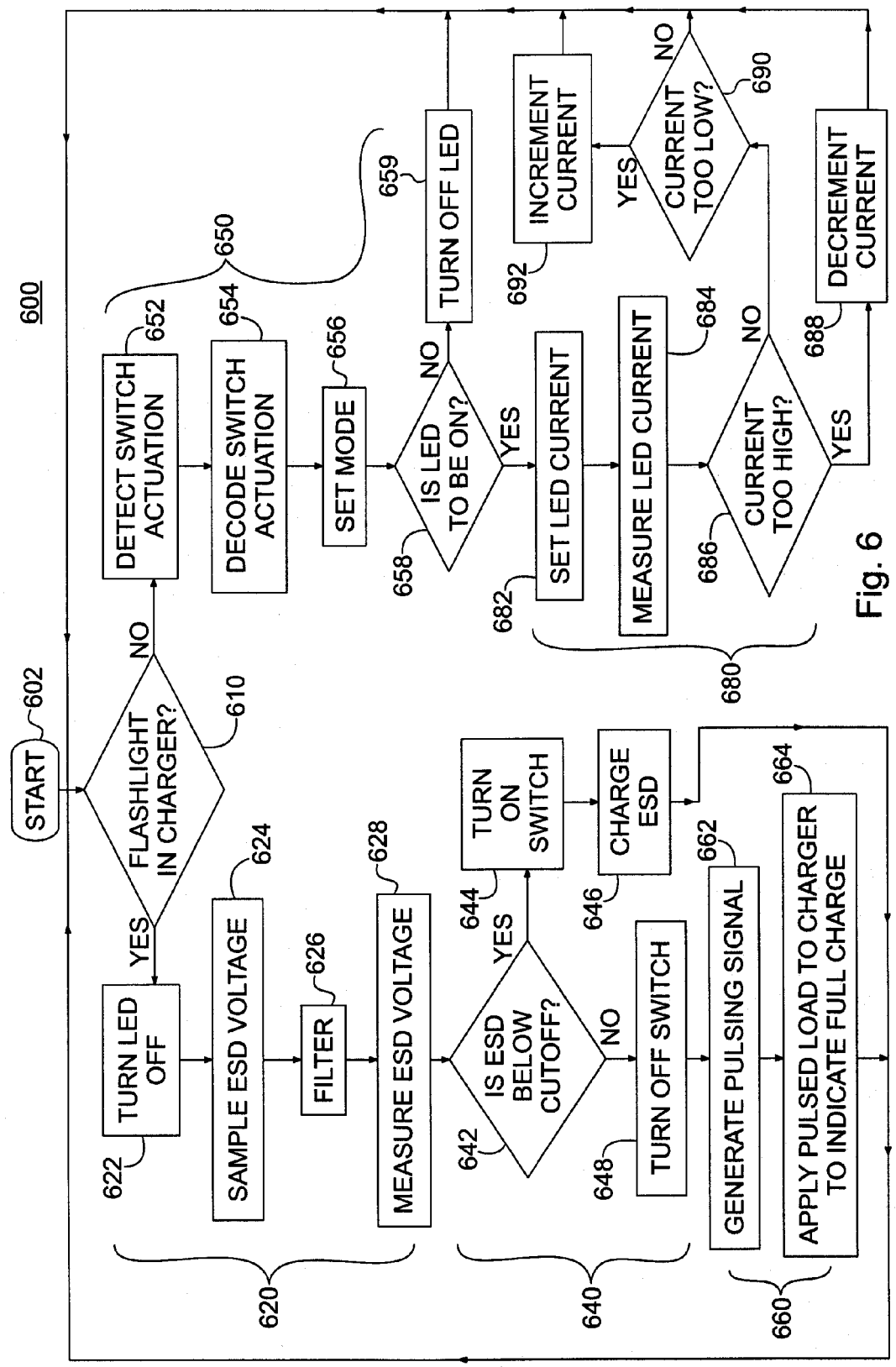
FIG. 6 is a flow chart block diagram of the process performed by the example embodiment of the adapter circuitry arrangement as shown in FIG. 5.

Operation of the example essentially digital adapter circuitry 300' embodiment of adapter 100, 100' as shown in FIG. 5 in conjunction with the flow chart block diagram of the process 400 of FIG. 6 is as follows:

In an essentially digital embodiment of electronic circuit 300', a micro-processor or other digital processor 356 under the control of programming instructions stored in its internal memory M or in an external electronic memory M, performs at least the functions of circuit sections 320, 340 and 360, e.g., the voltage sensing and detecting function performed in the analog circuit embodiment by voltage regulating device IC2, the battery protection function performed in the analog circuit embodiment by transistors Q6 and Q9 in controlling bi-directional transistors Q8, and the pulse generating function performed in the analog circuit embodiment by timing device IC1.

In the illustrated circuit 300', processor 356 also performs the functions described above in relation to controller 56 in selectively energizing LED 60 responsive to operation of switch 55, although controller 56 could be provided separate from processor 356, if desired. Switch 55 is illustrated by way of example as having two contacts with both connected to a common switch input SWC of processor 356 and with each switch contact also connected to a separate switch input, SW1, SW2 of processor 356.

Further, while switch 55 is illustrated as having two contacts as an example, switch 55 could be two contacts of one switch, or two separate switches, and/or additional switches may be provided, and the switch connections may be of different forms, e.g., selectively connecting resistors so as to present different voltages to processor rather than switch closures and openings as does switch 55 as illustrated.

Further, light 10, 10' may include any desired number of light sources L and/or 60, which light sources may be directly switched by a switch, e.g., as lamp L is switched by switch SW, or may be indirectly switched by a switch, e.g., one or more switches like switch 55, for causing processor 356 to control the light source L, 60.

While the LED light source 60, 60' may be directly controlled by current provided via an output Lo, Lo' of processor 356, in a more typical example, where LED 60 is for illumination and so will require a more substantial current to produce greater intensity of illumination, output Lo, Lo' is connected to a control transistor Q20, Q20' which carries and controls the current flowing in LED 60, 60'. Where adapter 100, 100' is integrated in a light 10, 10', e.g., as in light 10' of FIG. 1B, the LED illumination circuit 60, Q20 may be connected between busses 302 and 304a or the LED illumination circuit 60', Q20 may be connected between busses 302 and 304b, as may be desired.

Further, it may be desired to control the voltage applied to LED 60, 60' rather than to directly apply the voltage provided by battery 150, and to that end an optional voltage conversion circuit may be provided either as a conversion circuit 358 that is included within the functioning of processor 356, e.g., as illustrated in relation to LED 60', or as a separate voltage conversion circuit 358, e.g., as illustrated in relation to LED 60.

In the digital embodiment as in the analog embodiment, bi-directional transistors Q8 are conductive (i.e. on) because their respective gate electrodes G are connected to positive potential, e.g., such as to positive bus 302 via a resistor internal to processor 356 (similarly in function to resistor R12 of circuit 300), while their source electrodes float at the relatively negative voltage of busses 304a and 304b, and bi-directional transistors Q8 are rendered non-conductive (i.e. off) when their gate electrodes G are connected to their source electrodes S internally to processor 356 (similarly in function to transistor Q9 of circuit 300 becoming conductive, i.e. turned on). A conversion circuit 358 may reduce the voltage provided by battery 150 or may increase the voltage provided thereby as is known.

The digital processor 356 senses battery voltage via a voltage divider R19, R22 which usually will, but may not include a filter capacitor C5. The voltage divider of circuit 300' may or may not include the ripple compensation provided by transistor Q12, resistor R24 and capacitors C6, C7 of circuit 300. Filtering may be performed by processor 356 by applying digital filtering in known manner. Processor 356 typically includes an internal voltage reference for comparison for detecting the predetermined battery voltage at which charging is terminated, e.g., about 4.2 volts for Li-Ion battery 150, and a processor output S, G may control bi-directionally controllable conductivity protection element Q8 either directly, e.g., by driving their gates and sources, or via a transistor Q9 and resistor R16 as in circuit 300, or indirectly via one or more intermediate transistors, e.g., by driving transistor Q9 or an alternative driving circuit, e.g., any of the foregoing represented as level shifter circuit 354 connected between processor 356 and transistor Q8.

In addition, the digital processor 356 also responds to its terminating the charging of battery 150 by enabling a pulse generating software function 360 or, if the pulse generating function is running, for enabling a processor output P for controlling the pulsing on of transistor Q1 and load resistor R1, either directly or alternatively indirectly via one or more intermediate transistors, such as transistor Q2 and/or Q3 as in circuit 300.

The digital processor 356 typically requires a reasonably controlled source of electrical power (voltage), usually not a regulated voltage source, for its operation. Operating voltage at inputs V+ and V− of the digital processor 356 may be provided from battery 150 or from charger 410 when adapter 400 is connected to charger 400, or from both, e.g., via a pair of diodes serving as an OR function so that the higher voltage powers the digital processor. (A diode OR function is provided, e.g., by diodes D4, D5 of circuit 300 for coupling transistors Q5 and Q9 to transistor Q6). If the variation of voltage V+, V− available from charger 400 and battery 150 is larger than desired, a voltage regulator may be provided, e.g., similarly to the voltage regulator provided by Zener diode D1 and transistor Q4 of circuit 300.

FIG. 6 is a flow chart block diagram of the example process 600 performed by the example embodiment of the adapter circuitry arrangement 300' as shown in FIG. 5. Example process 600 commences 602 at a start point and proceeds to determine 610 whether the light 10, 10' is or is not connected to a charging device. If light 10, 10' is in a charging device (610-Y), the light source, e.g., lamp L and/or LED 60, is turned off 622 and charging of the battery 150 thereof proceeds. If light 10, 10' is not in a charging device (610-N), then process 600 proceeds for the operation of light 10, 10'.

If light 10, 10' is in a charging device (610-Y) and the light source, e.g., lamp L and/or LED 60, is turned off 622, then charging of the battery 150 thereof proceeds as follows. As in battery voltage detection 320 above, battery voltage detection 620 steps include sampling 624 the voltage of the battery or other energy storage device (ESD), filtering 626 the sampled ESD voltage to remove any undesired noise and/or ripple voltage components, and measuring 628 the resulting sampled and filtered ESD voltage.

The measured 620 ESD voltage is then utilized to determine whether action is necessary for the protection 640 of battery 150 being charged, similarly to battery protection 340 above. If the measured 620 ESD voltage is determined 642 to be below a pre-determined cut-off voltage value, then 642-Y charging of battery 150 is safe and charging current is applied 644 to charge battery 150, e.g. by turning on the bidirectional switch Q8 of circuit 300, thereby charging 646 the ESD as is appropriate. With charging current thus applied, process 600 returns in a loop to determine 610 whether light 10, 10' is or is not connected to a charging device. This foregoing charging loop 610, 620, 640, 646 continues so long as the voltage of the battery or other ESD 150 is below the predetermined cut-off value and light 10, 10' remains connected 610 to the charging device.

As battery/ESD 150 continues to charge (recharge), its voltage will increase as it accumulates charge stored therein. When the charge accumulated therein reaches a level approaching full (100%) charge, the voltage will reach the predetermined voltage, e.g., about 4.2 volts in the typical example of a Li-Ion battery 150 herein. When the ESD voltage reaches that level, it is not below (i.e. is at or above) the predetermined cut-off 642-N voltage and so the battery protection 640 function of process 600 terminates 648 the charging of battery or ESD 150, e.g. by turning off the bidirectional switch Q8 of circuit 300, thereby ending the charging 646 of the ESD as is appropriate. This "fully charged" condition, typically at about 95% of full charge for a Li-Ion battery, typically continues as process 600 runs in a loop 610, 620, 640, 648 with no further charging current applied to ESD 150 so long as light 10, 10' remains connected 610 to the charging device.

Optionally, following the termination 648 of charging, a pulsed load, e.g., transistor Q1 and resistor R1, may be applied 660 across the terminals of the charging device 400 so as to cause its charging indicator to turn on and off with the application and removal of the pulsed load as described above. Application 660 of such pulsed load may include two or more steps, e.g., the generation 662 of the desired pulse on, pulse off signal, and the application 664 of that signal, e.g. to transistor Q1 to apply and remove the load provided by resistor R1.

The charging portion 610, 620, 640 of process 600 described above continues for as long as light 10, 10' remains connected 610 to the charging device. When light 10, 10' is removed 610-N from the charging device, or if light 10, 10' is not connected to a charging device, or if the charging device does not provide any electrical power for charging light 10, 10', e.g. when the power source is removed or fails, e.g., as in a power outage, process 600 follows 610-N to the portion of process 600 that controls operation of light 10, 10'. It is noted that this operating portion of process 600 is essentially the function performed by controller 56 as described above.

Thus, a controller 56 may be provided for controlling operation of light 10, 10' separately and in conjunction with a processor 356 that controls the charging of the battery or other ESD 150. Alternatively, a processor 356 may be provided for controlling both the operation of light 10, 10' and the charging of the battery or other ESD thereof.

Operating 650 of light 10, 10' begins with the actuation of a switch thereof, e.g., switch 55, by an operator. Switch actuation is detected 652 and decoded 654 to determine the mode that the operator has signaled by the manner in which switch 55 has been actuated. For example, less than full actuation could signal a momentary on operation, full actuation could signal continuous on operation, plural actuations with different timings could signal a flashing or blinking mode, an extended actuation could signal a dimming or an un-dimming mode, and the like. Once the signaled mode is decoded 654, processor 356 sets 656 the decoded mode to control light 10, 10' to operate in that mode.

If the light source L, 60 is not to be on (658-N) in the selected 652-656 mode, then the light source L, 60 is turned off 659 and process 600 returns to decision 610 in a loop 610, 650 for operating control so long as light 10, 10' is not receiving 610-N charging power and is not signaled to turn on. To reduce power consumption, the loop 610-650 could be paused or stopped at detection step 652 until a switch actuation is detected 652.

If the light source L, 60 is to be on (658-Y) in the selected 652-656 mode, then the light source is turned on and operated 680 by setting 682, e.g., the level of LED current that corresponds to the selected mode. Control 680 of that current level includes measuring 684 the current flowing in the light source, e.g., LED, and controlling 680 it to the desired level.

For example, determining 686 that the measured current is too high 686-Y, e.g., the current measured exceeds the level set 682 for the selected 650 mode, results in the level of current being decremented (reduced) 688 by a predetermined amount and loop 610-650-680 continues. Determining 686 that the measured current is not too high 686-N, e.g., the current measured does not exceed the level set 682 for the selected 650 mode, results in the level of current being tested 690 to determine if the measured current is too low. If the measured current is determined 690 to be too low 690-Y, then the current is incremented (increased) 692 by a predetermined amount and loop 610-650-680 continues. If the measured current is determined 690 not to be too low 690-N, then the current is not changed and loop 610-650-680 continues. Current control loop 610-650-680 continues to run as a loop adjusting the current to the level corresponding to the selected 650 mode until a switch actuation is detected 652 that changes the mode or until application of charging power to light 10, 10' is detected 610-Y.

Thus, the combined functions of controlling the operation of light 10, 10' and the charging of the battery 150 or other ESD thereof may all be performed by essentially digital circuit 300' including digital processor 356, or by circuit 300' with digital processor 356 controlling battery charging and a controller 56 controlling operation, or by an essentially analog circuit 300, as may be convenient for a particular light.

An adapter 100, 100' for replacing an original battery with a replacement battery 150 of a different type may comprise: a first pair of terminals 122, 124 in a configuration substantially similar to terminals of an original battery; a second pair of terminals 202, 204 for electrically connecting to a replacement battery 150; a controllable variable conductivity device Q8 coupled between one of the first pair of terminals 124 and one of the second pair of terminals 204, wherein variable conductivity device Q8 has a high conductivity when a replacement battery 150 connected to second pair of terminals 202, 204 provides electrical power to a load 60 connected to first pair of terminals 122, 124; a conductive connection 302 between the other of first pair of terminals 122 and the other of second pair of terminals 202; and a battery charging control circuit 300, 300' coupled to second pair of terminals 202, 204 for sensing the voltage therebetween for controlling the conduction of the variable conductivity device Q8 to a reduced conductivity for limiting the charging of a replacement battery 150 when a replacement battery 150 is connected to second pair of terminals 202, 204 and a battery charging device 400 is connected to first pair of terminals 122, 124. Adapter 100, 100' may further comprise a latching circuit 340, Q6, Q7 responsive to the limiting of the charging of the replacement battery 150 for further controlling the conduction of variable conductivity device Q8 to the reduced conductivity when the battery charging device 400 is connected to first pair of terminals 122, 124. Adapter 100, 100' may further comprise a pulsing circuit 360 responsive to the limiting of the charging of the replacement battery 150 for repetitively and periodically applying a load R1 between first pair of terminals 122, 124 when a replacement battery 150 is connected to second pair of terminals 202, 204 and a battery charging device 400 is connected to first pair of terminals 122, 124. The original battery may be a nickel-cadmium battery and the replacement battery 150 may be a lithium-ion battery 150.

An adapter 100, 100' for replacing an original battery with a replacement battery 150 of a different type may comprise: a first pair of terminals 122, 124 in a configuration substantially similar to terminals of an original battery; a second pair of terminals 202, 204 for electrically connecting to a replacement battery 150; a housing 110, 120 210 for supporting first pair of terminals 122, 124 and second pair of terminals 202, 204; an electronic circuit 300 disposed in housing 110, 120, 210 for controlling the charging of the replacement battery 150 when the replacement battery 150 is connected to second pair of terminals 202, 204 and a battery charging device 400 is connected to first pair of terminals 122, 124. The first pair of terminals 122, 124 may include a central terminal 122 and an annular ring terminal 124 surrounding central terminal 124; or second pair of terminals 202, 204 may include an inner 202 and an outer 204 concentric and coaxial spring terminal; or first pair of terminals 122, 124 may include a central terminal 122 and an annular ring terminal 124 surrounding central terminal 122 and second pair of terminals 202, 204 may include inner 202 and outer 204 concentric and coaxial spring terminals.

An adapter 100, 100' for replacing an original battery with a replacement battery 150 of a different type, adapter 100, 100' comprising: a first pair of terminals 122, 124 in a configuration substantially similar to terminals of an original battery, a second pair of terminals 202, 204 for electrically connecting to a replacement battery 150; a controllable conductivity device Q8 coupled between one of the first pair of terminals 122, 124 and one of the second pair of terminals 202, 204, wherein controllable conductivity device Q8 has a high conductivity when a replacement battery connected to second pair of terminals 202, 204 provides electrical power to a load Q1, R1 connected to first pair of terminals 122, 124; a conductive connection between the other of first pair of terminals 122, 124 and the other of second pair of terminals 202, 204; and a battery charging control circuit 320, 340 coupled to second pair of terminals 202, 204 for sensing the voltage therebetween for controlling the conduction of the controllable conductivity device Q8 to a reduced conductivity for limiting the charging of a replacement battery 150 when a replacement battery 150 is connected to second pair of terminals 202, 204 and a battery charging device 400 is connected to first pair of terminals 122, 124. Battery charging control circuit 320, 340 may reduce the charging current applied to a replacement battery 150 substantially to zero current when the voltage of the replacement battery 150 reaches a predetermined potential. Adapter 100, 100' may further comprise a latching circuit 340 responsive to the limiting of the charging of the replacement battery 150 for further controlling the conduction of controllable conductivity device Q8 to the reduced conductivity when the battery charging device 400 is connected to first pair of terminals 122, 124. Latching circuit 340 may reduce the conductivity of controllable conductivity device Q8 to reduce the charging current applied to the replacement battery 150 substantially to zero current when the voltage of the replacement battery 150 reaches a predetermined potential. Adapter 100, 100' may further comprise a pulsing circuit 360 responsive to the limiting of the charging of the replacement battery 150 for repetitively and periodically applying a load Q1, R1 between first pair of terminals 122, 124 when a replacement battery 150 is connected to second pair of terminals 202, 204 and a battery charging device 400 is connected to first pair of terminals 122, 124. Battery charging control circuit 320, 340 may couple a battery charging device 400 for an original battery to a replacement battery 150 of a different type for charging the replacement battery 150 of a different type. Battery charging device 400 may have an indicator for indicating when a battery is connected thereto, and adapter 100, 100' may further comprise: a pulsing circuit 360 responsive to the limiting of the charging of the replacement battery 150 for repetitively and periodically applying a load Q1, R1 between first pair of terminals 122, 124 for causing the indicator of charging device to indicate that a battery is connected thereto. Battery charging device 400 may include a flasher, e.g., a flasher circuit, for causing the indicator to turn on and off at a predetermined rate when an original battery is charged, and wherein pulsing circuit 360 repetitively and periodically applies the load Q1, R1 at a rate higher than the predetermined rate. The adapter 100, 100' may further comprise: a housing 110 in a configuration substantially similar to that of the original battery, housing 110 having a cavity for receiving the replacement battery 150, and wherein housing 110 includes first pair of terminals 122, 124 and second pair of terminals 202, 204. Housing 110 may enclose a replacement battery 150 received in the cavity of housing 110; or housing 110 may enclose controllable conductivity device Q8, conductive connection and battery charging control circuit 300, 300'; or housing 110 may enclose a replacement battery 150 received in the cavity of housing 110 and may enclose controllable conductivity device Q8, conductive connection and battery charging control circuit 300, 300'. First pair of terminals 122, 124 may include a central terminal 122 and an annular ring terminal 124 surrounding central terminal 122; or second pair of terminals 202, 204 may include inner and outer coaxial spring terminals 202, 204; or first pair of terminals 122, 124 may include a central terminal 122 and an annular ring terminal 124 surrounding central terminal 122 and second pair of terminals 202, 204 may include inner and outer coaxial spring terminals 202, 204. The original battery may be a nickel-cadmium battery and the replacement battery 150 may be a lithium-ion battery.

An adapter 100, 100' for replacing an original battery with a replacement battery 150 of a different type, adapter 100, 100' may comprise: a first pair of terminals 122, 124 in a configuration substantially similar to terminals of an original battery; a second pair of terminals 202, 204 for electrically connecting to a replacement battery 150; a housing 110 for supporting first pair of terminals 122, 124 and second pair of terminals 202, 204; and an electronic circuit 300, 300' disposed in housing 110 for controlling the charging of the replacement battery 150 when a replacement battery 150 is connected to second pair of terminals 202, 204 and a battery charging device 400 is connected to first pair of terminals 122, 124. Housing 110 may have a configuration substantially similar to that of the original battery and has a cavity for receiving a replacement battery 150. Housing 110 may have a cavity for receiving a replacement battery 150, and adapter 100, 100' may further comprise: a replacement battery 150 in the cavity of housing 110; or a replacement battery 150 enclosed in the cavity of housing 110. Electronic circuit 300 may reduce the charging current applied to the replacement battery 150 substantially to zero current when the voltage of the replacement battery 150 reaches a predetermined potential. First pair of terminals 122, 124 may include a central terminal 122 and an annular ring terminal 124 surrounding central terminal; or second pair of terminals 202, 204 may include inner and outer coaxial spring terminals 202, 204; or first pair of terminals 122, 124 may include a central terminal 122 and an annular ring terminal 124 surrounding central terminal 122 and second pair of terminals 202, 204 may include inner and outer coaxial spring terminals 202, 204. Electronic circuit 300, 300' may comprise: a controllable conductivity device Q8 coupled between one of the first pair of terminals 122, 124 and one of the second pair of terminals 202, 204, wherein controllable conductivity device Q8 has a high conductivity when a replacement battery 150 connected to second pair of terminals 202, 204 provides electrical power to a load Q1, R1 connected to first pair of terminals 122, 124; a conductive connection 302 between the other of first pair of terminals 122, 124 and the other of second pair of terminals 202, 204; and a battery charging control circuit 300, 300' coupled to second pair of terminals 202, 204 for sensing the voltage therebetween for controlling the conduction of the controllable conductivity device Q8 to a reduced conductivity for limiting the charging of a replacement battery 150 when a replacement battery 150 is connected to second pair of terminals 202, 204 and a battery charging device 400 is connected to first pair of terminals 122, 124. Electronic circuit 300, 300' may further comprise a latching circuit 340 responsive to the limiting of the charging of the replacement battery 150 for further controlling the conduction of controllable conductivity device Q8 to the reduced conductivity when the battery charging device 400 is connected to first pair of terminals 122, 124. Latching circuit 340 may reduce the conductivity of controllable conductivity device Q8 to reduce the charging current applied to the replacement battery 150 substantially to zero current when the voltage of the replacement battery 150 reaches a predetermined potential. Electronic circuit 300, 300' may further comprise a pulsing circuit 360 responsive to the limiting of the charging of the replacement battery 150 for repetitively and periodically applying a load Q1, R1 between first pair of terminals 122, 124 when a replacement battery 150 is connected to second pair of terminals 202, 204 and a battery charging device 400 is connected to first pair of terminals 122, 124. Electronic circuit 300, 300' may further comprise a battery charging control circuit 300, 300' coupling a battery charging device 400 for an original battery to a replacement battery 150 of a different type for charging the replacement battery 150 of a different type. Battery charging device 400 may have an indicator for indicating when a battery is connected thereto, and adapter 100, 100' may further comprise: a pulsing circuit 360 responsive to the limiting of the charging of the replacement battery 150 for repetitively and periodically applying a load Q1, R1 between first pair of terminals 122, 124 for causing the indicator of charging device to indicate that a battery is connected thereto. Battery charging device 400 may include a flasher, e.g., a flasher circuit, for causing the indicator to turn on and off at a predetermined rate when an original battery is charged, and wherein pulsing circuit 360 repetitively and periodically applies the load Q1, R1 at a rate higher than the predetermined rate. The original battery may be a nickel-cadmium battery and the replacement battery 150 may be a lithium-ion battery.

An adapter 100, 100' for charging and/or recharging a battery powered device 10, 10', 100, 100' of a first battery type utilizing a charging device 400 for a battery of a second battery type, wherein the first and second battery types are different, adapter 100, 100' may comprise: a first pair of terminals 58, 122, 124 in a configuration for electrically connecting to charging terminals of a charging device 400 for a battery of the second battery type; a second pair of terminals 202, 204 for electrically connecting to a battery powered device of the first battery type; a housing 20, 110, 110' for supporting first pair of terminals 58, 122, 124 and second pair of terminals 202, 204; and an electronic circuit 300, 300' disposed in housing 20, 110, 110' and connected between first and second pairs of terminals 58, 122, 124, 202, 204 for controlling the charging of the battery powered device 10, 10', 100, 100' of the first battery type when the battery powered device is connected to second pair of terminals 202, 204 and a battery charging device 400 for a battery of the second battery type is connected to first pair of terminals 58, 122, 124. Adapter 100, 100' may be a replacement for an original battery of the second battery type, and housing 110, 110' may be a battery housing 110, 110' having a configuration substantially similar to that of the original battery of the second battery type and having a cavity for receiving a replacement battery 150 of the first battery type. Housing 110, 110' is a battery housing 110, 110' having a cavity for receiving a replacement battery 150 of the first battery type, and adapter 100, 100' may further comprise: a replacement battery 150 of the first battery type in the cavity of housing 110, 110; or a replacement battery 150 of the first battery type enclosed in the cavity of housing 110, 110'. The battery powered device 10, 10', 100, 100' may be a light 10, 10' employing a battery of the first battery type, and housing 20 may be a light housing 20 having first pair of terminals 58 in a configuration substantially similar to that of an original light employing a battery of the second battery type and having a cavity for receiving a battery 150 of the first battery type. Housing 20 may be a light housing 20 having a cavity for receiving a replacement battery 150 of the first battery type, and adapter 100, 100' may further comprise: a light source L, 60 supported by light housing 20; a battery 150 of the first battery type in the cavity of light housing 20; and a switch SW, 55 for selectively controlling light source L, 60 for selectively producing light. The adapter 100, 100' may further comprise a controller 56, 356 connected between light source L, 60 and battery 150 of the first battery type for selectively energizing light source L, 60 responsive to switch SW, 55. Electronic circuit 300, 300' may reduce the charging current applied to the battery 150 substantially to zero current when the voltage of the battery 150 reaches a predetermined potential. First pair of terminals 58, 122, 124 may include a central terminal 122 and an annular ring terminal 124 surrounding central terminal; or second pair of terminals 202, 204, 402, 404 may include inner and outer coaxial spring terminals; or first pair of terminals may include a central terminal and an annular ring terminal surrounding central terminal and second pair of terminals may include inner and outer coaxial spring terminals. Electronic circuit 300, 300' may comprise: a controllable conductivity device Q8 coupled between one of the first pair of terminals and one of the second pair of terminals, wherein controllable conductivity device Q8 has a high conductivity when a battery of the first battery type connected to second pair of terminals provides electrical power to a load Q1, R1 connected to first pair of terminals; a conductive connection 302 between the other of first pair of terminals and the other of second pair of terminals; and a battery charging control circuit 300, 300' coupled to second pair of terminals for sensing the voltage therebetween for controlling the conduction of the controllable conductivity device Q8 to a reduced conductivity for limiting the charging of a battery 150 of the first battery type when a battery of the first battery type is connected to second pair of terminals and a battery charging device 400 for a battery of the second battery type is connected to first pair of terminals. The adapter 100, 100' may include a processor 356, wherein processor 356 provides battery charging control circuit 300, 300'. Electronic circuit 300, 300' may further comprise a latching circuit 340 responsive to the limiting of the charging of the battery 150 of the first battery type for further controlling the conduction of controllable conductivity device Q8 to the reduced conductivity when the battery charging device 400 for a battery of the second battery type is connected to first pair of terminals. Latching circuit 340 may reduce the conductivity of controllable conductivity device Q8 to reduce the charging current applied to the battery 150 of the first battery type substantially to zero current when the voltage of the battery of the first battery type reaches a predetermined potential. Electronic circuit 300, 300' may further comprise a pulsing circuit 360 responsive to the limiting of the charging of the battery 150 of the first battery type for repetitively and periodically applying a load Q1, R1 between first pair of terminals when a battery of the first battery type is connected to second pair of terminals and a battery charging device 400 for a battery of the second battery type is connected to first pair of terminals. The battery charging device 400 for a battery of the second battery type may have an indicator for indicating when a battery is connected thereto, and adapter 100, 100' may further comprise: a pulsing circuit 360 responsive to the limiting of the charging of the battery 150 of the first battery type for repetitively and periodically applying a load Q1, R1 between first pair of terminals for causing the indicator of charging device 400 to indicate that a battery is connected thereto. Battery charging device 400 may include a flasher, e.g., a flasher circuit, for causing the indicator to turn on and off at a predetermined rate when a battery of the second battery type is charged, and wherein pulsing circuit 360 repetitively and periodically applies the load Q1, R1 at a rate higher than the predetermined rate. The battery 150 of the first battery type may be a lithium-ion battery and the battery of the second battery type may be a nickel-cadmium battery.

An adapter 100, 100' and light 10, 10' powerable by a battery 150 of a first battery type and chargeable and/or rechargeable utilizing a charging device 400 for a battery of a second battery type, wherein the first and second battery types are different, adapter 100, 100' and light 10, 10' may comprise: a light housing 20 supporting a light source L, 60 and having a cavity for receiving a battery 150 of the first battery type therein; a first pair of terminals 58 on light housing 20 in a configuration for electrically connecting to charging terminals of a charging device 400 for a battery of the second battery type; a second pair of terminals 202, 204 in the cavity of light housing 20 for electrically connecting to a battery 150 of the first battery type; an electronic circuit 300, 300' disposed in light housing 20 and connected to first and second pairs of terminals for controlling the charging of the battery 150 of the first battery type when the battery of the first battery type is connected to second pair of terminals 202, 204 and a battery charging device 400 for a battery of the second battery type is connected to first pair of terminals 58; and a switch SW, 55 for selectively energizing light source L, 60 from the battery 150 of the first battery type when the battery of the first battery type is in the cavity of light housing 20. Electronic circuit 300, 300' may include: a processor 356 connected to first and second pairs of terminals 58, 202, 204; and a controllable conductivity device Q8 coupled between one of the first pair of terminals 58 and one of the second pair of terminals, wherein controllable conductivity device Q8 has a high conductivity when a battery 150 of the first battery type is connected to second pair of terminals 202, 204 to provide electrical power to light source L, 60. Processor 356 may include a controller 56 responsive to switch SW, 55 for selectively energizing light source L, 60. Electronic circuit 300, 300' may reduce the charging current applied to the battery 150 of the first battery type substantially to zero current when the voltage of the battery 150 of the first battery type reaches a predetermined potential. Electronic circuit 300, 300' may further comprise a latching circuit 340 responsive to the limiting of the charging of the battery 150 of the first battery type for further controlling the conduction of controllable conductivity device Q8 to the reduced conductivity when the battery charging device 400 for a battery of the second battery type is connected to first pair of terminals. Latching circuit 340 may reduce the conductivity of controllable conductivity device Q8 to reduce the charging current applied to the battery 150 of the first battery type substantially to zero current when the voltage of the battery of the first battery type reaches a predetermined potential. Electronic circuit 300, 300' may further comprise a pulsing circuit 360 responsive to the limiting of the charging of the battery 150 of the first battery type for repetitively and periodically applying a load Q1, R1 between first pair of terminals 58 when a battery of the first battery type is connected to second pair of terminals and a battery charging device 400 for a battery of the second battery type is connected to first pair of terminals. The battery 150 of the first battery type may be a lithium-ion battery and the battery of the second battery type may be a nickel-cadmium battery.

An adapter 100, 100' and light 10, 10' powerable by a lithium-ion battery and chargeable and/or rechargeable utilizing a charging device 400 for a nickel-cadmium battery, and adapter 100, 100' and light 10, 10' may comprise: a light housing 20 supporting a light source L, 60 and having a cavity for receiving a lithium-ion battery 150 therein; a first pair of terminals 58 on light housing 20 in a configuration for electrically connecting to charging terminals of a charging device 400 for a nickel-cadmium battery; a second pair of terminals 202, 204 in the cavity of light housing 20 for electrically connecting to a lithium-ion battery 150; an electronic circuit 300, 300' disposed in light housing 20 and connected to first and second pairs of terminals for controlling the charging of the lithium-ion battery 150 when the lithium-ion battery is connected to second pair of terminals 202, 204 and a battery charging device 400 for a nickel-cadmium battery is connected to first pair of terminals 58; and a switch SW, 55 for selectively energizing the light source L, 60 from the lithium-ion battery 150 when the lithium-ion battery is in the cavity of light housing 20. Electronic circuit 300, 300' may include: a processor 356 connected to first and second pairs of terminals 58, 202, 204; and a controllable conductivity device Q8 coupled between one of the first pair of terminals 58 and one of the second pair of terminals 202, 204, wherein controllable conductivity device Q8 has a high conductivity when a lithium-ion battery 150 is connected to second pair of terminals 202, 204 to provide electrical power to light source L, 60. Processor 356 may include a controller 56 responsive to switch SW, 55 for selectively energizing light source L, 60. Electronic circuit 300, 300' may reduce the charging current applied to the lithium-ion battery 150 substantially to zero current when the voltage of the lithium-ion battery reaches a predetermined potential. Electronic circuit 300, 300' may further comprise a latching circuit 340 responsive to the limiting of the charging of the lithium-ion battery 150 for further controlling the conduction of controllable conductivity device Q8 to the reduced conductivity when the battery charging device 400 for a nickel-cadmium battery is connected to first pair of terminals 58. Latching circuit 340 may reduce the conductivity of controllable conductivity device Q8 to reduce the charging current applied to the lithium-ion battery 150 substantially to zero current when the voltage of the lithium-ion battery reaches a predetermined potential. Electronic circuit 300, 300' may further comprise a pulsing circuit 360 responsive to the limiting of the charging of the lithium-ion battery 150 for repetitively and periodically applying a load Q1, R1 between first pair of terminals 58 when a lithium-ion battery is connected to second pair of terminals 202, 204 and a battery charging device 400 for a nickel-cadmium battery is connected to first pair of terminals 58.

An adapter 100, 100' for replacing an original nickel-cadmium battery with a replacement lithium-ion battery 150 may comprise: a housing 110, 110' in a configuration substantially similar to that of an original nickel-cadmium battery, housing 110, 110' having a cavity for receiving a lithium-ion replacement battery 150; a lithium-ion replacement battery 150 in the cavity of housing 110, 110; housing 110, 110' including a first pair of terminals 122, 124 in a configuration substantially similar to terminals of the original nickel-cadmium battery; housing 110, 110' including a second pair of terminals 202, 204 electrically connecting to lithium-ion replacement battery 150; a controllable conductivity device Q8 coupled between one of the first pair of terminals 122, 124 and one of the second pair of terminals 202, 204, wherein controllable conductivity device Q8 has a high conductivity when lithium-ion replacement battery 150 connected to second pair of terminals 202, 204 is providing electrical power to a load L, 60, connected to first pair of terminals 122, 124; a conductive connection 302 between the other of first pair of terminals and the other of second pair of terminals; and a battery charging control circuit 300, 300' coupled to second pair of terminals 202, 204 for sensing the voltage therebetween for controlling the conduction of the controllable conductivity device Q8 to a reduced conductivity for limiting the charging of lithium-ion replacement battery 150 connected to second pair of terminals 202, 204 when a battery charging device 400 is connected to first pair of terminals. Battery charging control circuit 300, 300' may reduce the charging current applied to lithium-ion replacement battery 150 substantially to zero current when the voltage of lithium-ion replacement battery 150 reaches a predetermined potential. The adapter 100, 100' may further comprise a latching circuit 340 responsive to the limiting of the charging of lithium-ion replacement battery 150 for further controlling the conduction of controllable conductivity device Q8 to the reduced conductivity when a battery charging device 400 is connected to first pair of terminals 122, 124. Latching circuit 340 may reduce the conductivity of controllable conductivity device Q8 to reduce the charging current applied to lithium-ion replacement battery 150 substantially to zero current when the voltage of lithium-ion replacement battery 150 reaches a predetermined potential. The adapter 100, 100' may further comprise a pulsing circuit 360 responsive to the limiting of the charging of lithium-ion replacement battery 150 for repetitively and periodically applying a load Q1, R1 between first pair of terminals when a battery charging device 400 is connected to first pair of terminals. Battery charging control circuit 300, 300' may couple a battery charging device 400 for an original nickel-cadmium battery to lithium-ion replacement battery 150 for charging lithium-ion replacement battery 150. Battery charging device 400 may have an indicator for indicating when a battery is connected thereto, and adapter 100, 100' may further comprise: a pulsing circuit 360 responsive to the limiting of the charging of lithium-ion replacement battery 150 for repetitively and periodically applying a load Q1, R1 between first pair of terminals for causing the indicator of charging device to indicate that a battery is connected thereto. Battery charging device 400 may include a flasher, e.g., a flasher circuit, for causing the indicator to turn on and off at a predetermined rate when an original battery is charged, and pulsing circuit 360 may repetitively and periodically apply the load Q1, R1 at a rate higher than the predetermined rate.

An adapter 100, 100' for replacing an original battery with a replacement battery 150 of a different type, adapter 100, 100' may comprise: a housing 110, 110' in a configuration substantially similar in size and shape to that of an original battery, housing 110, 110' having a cavity for receiving a replacement battery 150; housing 110, 110' including a first pair of terminals 122, 124 in a configuration substantially similar to terminals of an original battery; housing 110, 110' including a second pair of terminals 202, 204 for electrically connecting to a replacement battery 150 when a replacement battery 150 is in the cavity of housing 110, 110'; a controllable conductivity device Q8 coupled between one of the first pair of terminals and one of the second pair of terminals, wherein controllable conductivity device Q8 has a high conductivity when a replacement battery 150 is connected to second pair of terminals 202, 204 to provide electrical power to a load L, 60 connected to first pair of terminals 122, 124; a conductive connection 302 between the other of first pair of terminals and the other of second pair of terminals; and a battery charging control circuit 300, 300' coupled to second pair of terminals 202, 204 for sensing the voltage therebetween for controlling the conduction of the controllable conductivity device Q8 to a reduced conductivity for limiting the charging of a replacement battery 150 when a replacement battery 150 is connected to second pair of terminals 202, 204 and a battery charging device 400 is connected to first pair of terminals 122, 124. The adapter 100, 100' may further comprise: a replacement battery 150 in the cavity of housing 20, or a replacement battery 150 completely enclosed in the cavity of housing 20. Battery charging control circuit 300, 300' may reduce the charging current applied to a replacement battery 150 substantially to zero current when the voltage of the replacement battery 150 reaches a predetermined potential. The adapter 100, 100' may further comprise a latching circuit 340 responsive to the limiting of the charging of the replacement battery 150 for further controlling the conduction of controllable conductivity device Q8 to the reduced conductivity when the battery charging device 400 is connected to first pair of terminals 122, 124. Latching circuit 340 may reduce the conductivity of controllable conductivity device Q8 to reduce the charging current applied to the replacement battery 150 substantially to zero current when the voltage of the replacement battery 150 reaches a predetermined potential. The adapter 100, 100' may further comprise a pulsing circuit 360 responsive to the limiting of the charging of the replacement battery 150 for repetitively and periodically applying a load Q1, R1 between first pair of terminals when a replacement battery 150 is connected to second pair of terminals and a battery charging device 400 is connected to first pair of terminals. Battery charging control circuit 300, 300' may couple a battery charging device 400 for an original battery to a replacement battery 150 of a different type for charging the replacement battery 150 of a different type. Battery charging device 400 may have an indicator for indicating when a battery is connected thereto, and adapter 100, 100' may further comprise: a pulsing circuit 360 responsive to the limiting of the charging of the replacement battery 150 for repetitively and periodically applying a load Q1, R1 between first pair of terminals for causing the indicator of charging device to indicate that a battery is connected thereto. Battery charging device 400 may include a flasher, e.g., a flasher circuit, for causing the indicator to turn on and off at a predetermined rate when an original battery is charged, and pulsing circuit 360 may repetitively and periodically apply the load Q1, R1 at a rate higher than the predetermined rate. Housing 110, 110' may enclose a replacement battery 150 received in the cavity of housing 20; or housing 110, 110' may enclose controllable conductivity device Q8, conductive connection 302 and battery charging control circuit 300, 300; or housing 110, 110' may enclose a replacement battery 150 received in the cavity of housing 110, 110' and may enclose controllable conductivity device Q8, conductive connection 302 and battery charging control circuit 300, 300'. First pair of terminals 122, 124 may include a central terminal 122 and an annular ring terminal 124 surrounding central terminal; or second pair of terminals 202, 204 may include inner and outer coaxial spring terminals; or first pair of terminals 122, 124 may include a central terminal and an annular ring terminal surrounding central terminal and second pair of terminals 202, 204 may include inner and outer coaxial spring terminals. The original battery may be a nickel-cadmium battery and the replacement battery 150 may be a lithium-ion battery.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "front," "rear," "side," "top," "bottom," "forward," "backward," "under" and/or "over," may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

The term battery is used herein to refer to an electro-chemical device comprising one or more electro-chemical cells, and so a battery may include a single cell or plural cells, whether as individual units or as a packaged unit. Battery may also include other energy storage devices (ESDs) that can be electrically charged to store electrical energy therein and discharged to recover at least a part of the stored electrical energy, e.g., a capacitive storage device.

A pair of terminals in a configuration substantially similar to terminals of an original battery can make electrical contact with the contacts and/or terminals with which the terminals of the original battery would make contact, e.g., inside the housing of a light or other battery powered device. A pair of terminals in a configuration substantially similar to terminals of an original light or other battery powered device can make electrical contact with the contacts and/or terminals with which the terminals of the original light or other battery powered device would make contact, e.g., on the outside of the housing of a light or other battery powered device. The terms battery powered and battery operated considered equivalent and may be used interchangeably herein.

While the present invention has been described in terms of the foregoing example embodiments, variations within the scope and spirit of the present invention as defined by the claims following will be apparent to those skilled in the art. For example, an adapter 100, 100' of the sort described could be employed for utilizing a nickel-metal-hydride (NiMH) battery in place of a Ni—Cd battery, or for utilizing a Li-Ion battery in place of a NiMH battery, or for utilizing a Li-Ion battery in place of a lead-acid battery, or for utilizing a Li-Ion battery in place of an alkaline battery, or for utilizing a lithium polymer battery in place of a Ni—Cd or NiMH battery, or another desired substitution or combination of different battery types.

The adapter of the present arrangement may be used with any battery powered electrical and/or electronic device, whether the device originally utilized a single use battery or a rechargeable battery, whether to replace an original battery or to replace a device that utilized a different battery type. Examples of such devices may include, portable lights, flashlights, portable appliances, portable battery-powered vacuums, cell phones, personal digital assistants, portable CD and DVD players, portable music devices such as MP3 players and iPod® devices and the like, portable computers, and the like. In addition, an adapter of the present arrangement may be employed with charging devices and chargers of various types provided for use with the device and its original batteries.

Bidirectional transistors Q8 are a controlled conductivity device that may be operated in the present arrangement in an essentially analog fashion for providing a variable controlled conductivity in changing between high conductivity (e.g., on) and low conductivity (e.g., off) conditions or in an essentially digital fashion so as to change more quickly (e.g., switch) between high conductivity (e.g., on) and low conductivity (e.g., off) conditions. In the present arrangement, it is preferred that a latching circuit 340 be provided so that bidirectional transistors Q8 are caused to change relatively rapidly between the high conductivity (e.g., on) and low conductivity (e.g., off) conditions.

While light 10, 10' is illustrated, e.g., in FIGS. 1 and 4, as a light having a power source 100, 100', 150, a light source L, 60, e.g., a lamp or a light emitting diode (LED), and a switch 55, SW for selectively applying electrical power from battery 150 to light source L, 60, more complex light arrangements including lights having controllers, micro-processors and other digital and/or analog controllers may be provided as is known in the art. For example, an adapter 100, 100' as described herein may be utilized with different kinds of lights such as the controllable light described in U.S. Pat. No. 7,674,003 entitled "Flashlight Having Plural Switches and a Controller" issued Mar. 9, 2010 to Raymond L. Sharrah et al and in the light described in U.S. Pat. No. 7,466,082 entitled "Electronic Circuit Reducing and Boosting Voltage for Controlling LED Current" issued Dec. 16, 2008 to Mark W. Snyder et al, each of which is incorporated herein by reference in its entirety.

Finally, numerical values stated are typical or example values, are not limiting values, and do not preclude substantially larger and/or substantially smaller values. Values in any given embodiment may be substantially larger and/or may be substantially smaller than the example or typical values stated. For example, the numbers of battery cells, the charging voltages, the lamp flashing rates and the like, may be different from those stated herein.

What is claimed is:

1. An adapter for replacing an original battery with a replacement battery of a different type, said adapter comprising:
    a first pair of terminals in a configuration substantially similar to terminals of an original battery;
    a second pair of terminals for electrically connecting to a replacement battery;
    a controllable variable conductivity device coupled between one of the first pair of terminals and one of the second pair of terminals, wherein said variable conductivity device has a high conductivity when a replacement battery connected to said second pair of terminals provides electrical power to a load connected to said first pair of terminals;
    a conductive connection between the other of said first pair of terminals and the other of said second pair of terminals; and
    a battery charging control circuit coupled to said second pair of terminals for sensing the voltage therebetween for controlling the conduction of the variable conductivity device to a reduced conductivity for limiting the charging of a replacement battery when a replacement battery is connected to said second pair of terminals and a battery charging device is connected to said first pair of terminals.

2. The adapter of claim 1 wherein said battery charging control circuit reduces the charging current applied to a replacement battery substantially to zero current when the voltage of the replacement battery reaches a predetermined potential.

3. The adapter of claim 1 further comprising a latching circuit responsive to the limiting of the charging of the replacement battery for further controlling the conduction of said variable conductivity device to the reduced conductivity when the battery charging device is connected to said first pair of terminals.

4. The adapter of claim 3 wherein said latching circuit reduces the conductivity of said variable conductivity device to reduce the charging current applied to the replacement battery substantially to zero current when the voltage of the replacement battery reaches a predetermined potential.

5. The adapter of claim 1 further comprising a pulsing circuit responsive to the limiting of the charging of the replacement battery for repetitively and periodically applying a load between said first pair of terminals when a replacement battery is connected to said second pair of terminals and a battery charging device is connected to said first pair of terminals.

6. The adapter of claim 1 wherein said battery charging control circuit couples a battery charging device for an original battery to a replacement battery of a different type for charging the replacement battery of a different type.

7. The adapter of claim 6 wherein said battery charging device has an indicator for indicating when a battery is connected thereto, said adapter further comprising:
a pulsing circuit responsive to the limiting of the charging of the replacement battery for repetitively and periodically applying a load between said first pair of terminals for causing the indicator of said charging device to indicate that a battery is connected thereto.

8. The adapter of claim 7 wherein said battery charging device includes a flasher for causing the indicator to turn on and off at a predetermined rate when an original battery is charged, and wherein said pulsing circuit repetitively and periodically applies the load at a rate higher than the predetermined rate.

9. The adapter of claim 1 further comprising:
a housing in a configuration substantially similar to that of the original battery, said housing having a cavity for receiving the replacement battery, and wherein said housing includes said first pair of terminals and said second pair of terminals.

10. The adapter of claim 9 wherein:
said housing encloses a replacement battery received in the cavity of said housing; or
said housing encloses said controllable variable conductivity device, said conductive connection and said battery charging control circuit; or
said housing encloses a replacement battery received in the cavity of said housing and encloses said controllable variable conductivity device, said conductive connection and said battery charging control circuit.

11. The adapter of claim 1 wherein:
said first pair of terminals includes a central terminal and an annular ring terminal surrounding said central terminal; or
said second pair of terminals includes inner and outer coaxial spring terminals; or
said first pair of terminals includes a central terminal and an annular ring terminal surrounding said central terminal and said second pair of terminals includes inner and outer coaxial spring terminals.

12. The adapter of claim 1 wherein the original battery is a nickel-cadmium battery and the replacement battery is a lithium-ion battery.

13. An adapter for replacing an original battery with a replacement battery of a different type, said adapter comprising:
a first pair of terminals in a configuration substantially similar to terminals of an original battery;
a second pair of terminals for electrically connecting to a replacement battery;
a housing for supporting said first pair of terminals and said second pair of terminals; and
an electronic circuit disposed in said housing for controlling the charging of the replacement battery when a replacement battery is connected to said second pair of terminals and a battery charging device is connected to said first pair of terminals,
wherein said electronic circuit has a high conductivity when a replacement battery connected to said second pair of terminals provides electrical power to a load connected to said first pair of terminals, and has a reduced conductivity for limiting charging of a replacement battery when a replacement battery is connected to said second pair of terminals and a battery charging device is connected to said first pair of terminals.

14. The adapter of claim 13 wherein said housing has an exterior configuration substantially similar to that of the original battery and has a cavity for receiving a replacement battery.

15. The adapter of claim 13 wherein said housing has a cavity for receiving a replacement battery, said adapter further comprising:
a replacement battery in the cavity of said housing; or
a replacement battery enclosed in the cavity of said housing.

16. The adapter of claim 13 wherein said electronic circuit reduces the charging current applied to the replacement battery substantially to zero current when the voltage of the replacement battery reaches a predetermined potential.

17. The adapter of claim 13 wherein said electronic circuit further comprises a battery charging control circuit coupling a battery charging device for an original battery to a replacement battery of a different type for charging the replacement battery of a different type.

18. The adapter of claim 17 wherein said battery charging device has an indicator for indicating when a battery is connected thereto, said adapter further comprising:
a pulsing circuit responsive to the limiting of the charging of the replacement battery for repetitively and periodically applying a load between said first pair of terminals for causing the indicator of said charging device to indicate that a battery is connected thereto.

19. The adapter of claim 18 wherein said battery charging device includes a flasher for causing the indicator to turn on and off at a predetermined rate when an original battery is charged, and wherein said pulsing circuit repetitively and periodically applies the load at a rate higher than the predetermined rate.

20. The adapter of claim 13 wherein the original battery is a nickel-cadmium battery and the replacement battery is a lithium-ion battery.

21. An adapter for replacing an original battery with a replacement battery of a different type, said adapter comprising:
a first pair of terminals in a configuration substantially similar to terminals of an original battery;
a second pair of terminals for electrically connecting to a replacement battery;
a housing for supporting said first pair of terminals and said second pair of terminals; and
an electronic circuit disposed in said housing for controlling the charging of the replacement battery when a replacement battery is connected to said second pair of terminals and a battery charging device is connected to said first pair of terminals, wherein:
said first pair of terminals includes a central terminal and an annular ring terminal surrounding said central terminal; or
said second pair of terminals includes inner and outer coaxial spring terminals; or
said first pair of terminals includes a central terminal and an annular ring terminal surrounding said central terminal and said second pair of terminals includes inner and outer coaxial spring terminals.

22. An adapter for replacing an original battery with a replacement battery of a different type, said adapter comprising:
a first pair of terminals in a configuration substantially similar to terminals of an original battery;
a second pair of terminals for electrically connecting to a replacement battery;

a housing for supporting said first pair of terminals and said second pair of terminals; and an electronic circuit disposed in said housing for controlling the charging of the replacement battery when a replacement battery is connected to said second pair of terminals and a battery charging device is connected to said first pair of terminals, wherein said electronic circuit comprises:

a controllable conductivity device coupled between one of the first pair of terminals and one of the second pair of terminals, wherein said controllable conductivity device has the high conductivity when a replacement battery connected to said second pair of terminals provides electrical power to a load connected to said first pair of terminals;

a conductive connection between the other of said first pair of terminals and the other of said second pair of terminals; and a battery charging control circuit coupled to said second pair of terminals for sensing the voltage therebetween for controlling the conduction of the controllable conductivity device to the reduced conductivity for limiting the charging of a replacement battery when a replacement battery is connected to said second pair of terminals and a battery charging device is connected to said first pair of terminals.

23. The adapter of claim 22 wherein said electronic circuit further comprises a latching circuit responsive to the limiting of the charging of the replacement battery for further controlling the conduction of said controllable conductivity device to the reduced conductivity when the battery charging device is connected to said first pair of terminals.

24. The adapter of claim 23 wherein said latching circuit reduces the conductivity of said controllable conductivity device to reduce the charging current applied to the replacement battery substantially to zero current when the voltage of the replacement battery reaches a predetermined potential.

25. An adapter for replacing an original battery with a replacement battery of a different type, said adapter comprising:

a first pair of terminals in a configuration substantially similar to terminals of an original battery, a second pair of terminals for electrically connecting to a replacement battery;

a housing for supporting said first pair of terminals and said second pair of terminals: and an electronic circuit disposed in said housing for controlling the charging of the replacement battery when a replacement battery is connected to said second pair of terminals and a battery charging device is connected to said first pair of terminals, wherein said electronic circuit further comprises a pulsing circuit responsive to the limiting of the charging of the replacement battery for repetitively and periodically applying a load between said first pair of terminals when a replacement battery is connected to said second pair of terminals and a battery charging device is connected to said first pair of terminals.

26. An adapter for charging and/or recharging a battery powered device of a first battery type utilizing a charging device for a battery of a second battery type, wherein the first and second battery types are different, said adapter comprising:

a first pair of terminals in a configuration for electrically connecting to charging terminals of a charging device for a battery of the second battery type;

a second pair of terminals for electrically connecting to a battery powered device of the first battery type;

a housing for supporting said first pair of terminals and said second pair of terminals; and an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein said electronic circuit has a high conductivity when a battery of the first battery type connected to said second pair of terminals provides electrical power to a load connected to said first pair of terminals, and has a reduced conductivity for limiting charging of a battery of the first battery type when a battery of the first battery type is connected to said second pair of terminals and a battery charging device for a battery of the second battery type is connected to said first pair of terminals.

27. The adapter of claim 26 wherein said adapter is a replacement for an original battery of the second battery type, and wherein said housing is a battery housing having a configuration substantially similar to that of the original battery of the second battery type and having a cavity for receiving a replacement battery of the first battery type.

28. The adapter of claim 26 wherein said housing is a battery housing having a cavity for receiving a replacement battery of the first battery type, said adapter further comprising:

a replacement battery of the first battery type in the cavity of said housing; or a replacement battery of the first battery type enclosed in the cavity of said housing.

29. The adapter of claim 26 wherein the battery powered device is a light employing a battery of the first battery type, and wherein said housing is a light housing having said first pair of terminals in a configuration substantially similar to that of an original light employing a battery of the second battery type and having a cavity for receiving a battery of the first battery type.

30. The adapter of claim 26 wherein said electronic circuit reduces the charging current applied to the battery of the first battery type substantially to zero current when the voltage of the battery of the first battery type reaches a predetermined potential.

31. The adapter of claim 26 wherein the battery of the first battery type is a lithium-ion battery and the battery of the second battery type is a nickel-cadmium battery.

32. An adapter for charging and/or recharging a battery powered device of a first battery type utilizing a charging device for a battery of a second battery type, wherein the first and second battery types are different, said adapter comprising:

a first pair of terminals in a configuration for electrically connecting to charging terminals of a charging device for a battery of the second battery type;

a second pair of terminals for electrically connecting to a battery powered device of the first battery type;

a housing for supporting said first pair of terminals and said second pair of terminals; and an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein said housing is a light housing having a cavity for receiving a replacement battery of the first battery type, said adapter further comprising:
a light source supported by said light housing;
a battery of the first battery type in the cavity of said light housing; and
a switch for selectively controlling said light source for selectively producing light.

33. The adapter of claim 32 further comprising a controller connected between said light source and said battery of the first battery type for selectively energizing said light source responsive to said switch.

34. An adapter for charging and/or recharging a battery powered device of a first battery type utilizing a charging device for a battery of a second battery type, wherein the first and second battery types are different, said adapter comprising:
a first pair of terminals in a configuration for electrically connecting to charging terminals of a charging device for a battery of the second battery type;
a second pair of terminals for electrically connecting to a battery powered device of the first battery type;
a housing for supporting said first pair of terminals and said second pair of terminals; and
an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein:
said first pair of terminals includes a central terminal and an annular ring terminal surrounding said central terminal; or
said second pair of terminals includes inner and outer coaxial spring terminals; or
said first pair of terminals includes a central terminal and an annular ring terminal surrounding said central terminal and said second pair of terminals includes inner and outer coaxial spring terminals.

35. An adapter for charging and/or recharging a battery powered device of a first battery type utilizing a charging device for a battery of a second battery type, wherein the first and second battery types are different, said adapter comprising:
a first pair of terminals in a configuration for electrically connecting to charging terminals of a charging device for a battery of the second battery type;
a second pair of terminals for electrically connecting to a battery powered device of the first battery type;
a housing for supporting said first pair of terminals and said second pair of terminals; and
an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein said electronic circuit comprises:
a controllable conductivity device coupled between one of the first pair of terminals and one of the second pair of terminals, wherein said controllable conductivity device has the high conductivity when a battery of the first battery type connected to said second pair of terminals provides electrical power to a load connected to said first pair of terminals;
a conductive connection between the other of said first pair of terminals and the other of said second pair of terminals; and
a battery charging control circuit coupled to said second pair of terminals for sensing the voltage therebetween for controlling the conduction of the controllable conductivity device to the reduced conductivity for limiting the charging of a battery of the first battery type when a battery of the first battery type is connected to said second pair of terminals and a battery charging device for a battery of the second battery type is connected to said first pair of terminals.

36. The adapter of claim 35 wherein said electronic circuit further comprises a latching circuit responsive to the limiting of the charging of the battery of the first battery type for further controlling the conduction of said controllable conductivity device to the reduced conductivity when the battery charging device for a battery of the second battery type is connected to said first pair of terminals.

37. The adapter of claim 36 wherein said latching circuit reduces the conductivity of said controllable conductivity device to reduce the charging current applied to the battery of the first battery type substantially to zero current when the voltage of the battery of the first battery type reaches a predetermined potential.

38. The adapter of claim 35 including a processor, wherein said processor provides said battery charging control circuit.

39. An adapter for charging and/or recharging a battery powered device of a first battery type utilizing a charging device for a battery of a second battery type, wherein the first and second battery types are different, said adapter comprising:
a first pair of terminals in a configuration for electrically connecting to charging terminals of a charging device for a battery of the second battery type;
a second pair of terminals for electrically connecting to a battery powered device of the first battery type;
a housing for supporting said first pair of terminals and said second pair of terminals: and
an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein said electronic circuit further comprises a pulsing circuit responsive to the limiting of the charging of the battery of the first battery type for repetitively and periodically applying a load between said first pair of terminals when a battery of the first battery type is connected to said second pair of terminals and a battery charging device for a battery of the second battery type is connected to said first pair of terminals.

40. An adapter for charging and/or recharging a battery powered device of a first battery type utilizing a charging device for a battery of a second battery type, wherein the first and second battery types are different, said adapter comprising:
a first pair of terminals in a configuration for electrically connecting to charging terminals of a charging device for a battery of the second battery type;

a second pair of terminals for electrically connecting to a battery powered device of the first battery type;

a housing for supporting said first pair of terminals and said second pair of terminals; and an electronic circuit disposed in said housing and connected between said first and second pairs of terminals for controlling the charging of the battery powered device of the first battery type when the battery powered device is connected to said second pair of terminals and a battery charging device for a battery of the second battery type is connected to said first pair of terminals, wherein the battery charging device for a battery of the second battery type has an indicator for indicating when a battery is connected thereto, said adapter further comprising:

a pulsing circuit responsive to the limiting of the charging of the battery of the first battery type for repetitively and periodically applying a load between said first pair of terminals for causing the indicator of said charging device to indicate that a battery is connected thereto.

41. The adapter of claim 40 wherein the battery charging device includes a flasher for causing the indicator to turn on and off at a predetermined rate when a battery of the second battery type is charged, and wherein said pulsing circuit repetitively and periodically applies the load at a rate higher than the predetermined rate.

42. An adapter and light powerable by a battery of a first battery type and chargeable and/or rechargeable utilizing a charging device for a battery of a second battery type, wherein the first and second battery types are different, said adapter and light comprising:

a light housing supporting a light source and having a cavity for receiving a battery of the first battery type therein;

a first pair of terminals on said light housing in a configuration for electrically connecting to charging terminals of a charging device for a battery of the second battery type;

a second pair of terminals in the cavity of said light housing for electrically connecting to a battery of the first battery type;

an electronic circuit disposed in said light housing and connected to said first and second pairs of terminals for controlling the charging of the battery of the first battery type when the battery of the first battery type is connected to said second pair of terminals and a battery charging device for a battery of the second battery type is connected to said first pair of terminals; and a switch for selectively energizing said light source from the battery of the first battery type when the battery of the first battery type is in the cavity of said light housing.

43. The adapter of claim 42 wherein said electronic circuit includes:

a processor connected to said first and second pairs of terminals; and a controllable conductivity device coupled between one of the first pair of terminals and one of the second pair of terminals, wherein said controllable conductivity device has a high conductivity when a battery of the first battery type is connected to said second pair of terminals to provide electrical power to said light source.

44. The adapter of claim 43 wherein said processor includes a controller responsive to said switch for selectively energizing said light source.

45. The adapter of claim 42 wherein said electronic circuit reduces the charging current applied to the battery of the first battery type substantially to zero current when the voltage of the battery of the first battery type reaches a predetermined potential.

46. The adapter of claim 42 wherein said electronic circuit further comprises a latching circuit responsive to the limiting of the charging of the battery of the first battery type for further controlling the conduction of said controllable conductivity device to the reduced conductivity when the battery charging device for a battery of the second battery type is connected to said first pair of terminals.

47. The adapter of claim 46 wherein said latching circuit reduces the conductivity of said controllable conductivity device to reduce the charging current applied to the battery of the first battery type substantially to zero current when the voltage of the battery of the first battery type reaches a predetermined potential.

48. The adapter of claim 42 wherein said electronic circuit further comprises a pulsing circuit responsive to the limiting of the charging of the battery of the first battery type for repetitively and periodically applying a load between said first pair of terminals when a battery of the first battery type is connected to said second pair of terminals and a battery charging device for a battery of the second battery type is connected to said first pair of terminals.

49. The adapter of claim 42 wherein the battery of the first battery type is a lithium-ion battery and the battery of the second battery type is a nickel-cadmium battery.

50. An adapter and light powerable by a lithium-ion battery and chargeable and/or rechargeable utilizing a charging device for a nickel-cadmium battery, said adapter and light comprising:

a light housing supporting a light source and having a cavity for receiving a lithium-ion battery therein;

a first pair of terminals on said light housing in a configuration for electrically connecting to charging terminals of a charging device for a nickel-cadmium battery;

a second pair of terminals in the cavity of said light housing for electrically connecting to a lithium-ion battery;

an electronic circuit disposed in said light housing and connected to said first and second pairs of terminals for controlling the charging of the lithium-ion battery when the lithium-ion battery is connected to said second pair of terminals and a battery charging device for a nickel-cadmium battery is connected to said first pair of terminals; and a switch for selectively energizing the light source from the lithium-ion battery when the lithium-ion battery is in the cavity of said light housing.

51. The adapter of claim 50 wherein said electronic circuit includes:

a processor connected to said first and second pairs of terminals; and a controllable conductivity device coupled between one of the first pair of terminals and one of the second pair of terminals, wherein said controllable conductivity device has a high conductivity when a lithium-ion battery is connected to said second pair of terminals to provide electrical power to said light source.

52. The adapter of claim 51 wherein said processor includes a controller responsive to said switch for selectively energizing said light source.

53. The adapter of claim 50 wherein said electronic circuit reduces the charging current applied to the lithium-ion battery substantially to zero current when the voltage of the lithium-ion battery reaches a predetermined potential.

54. The adapter of claim 50 wherein said electronic circuit further comprises a latching circuit responsive to the limiting of the charging of the lithium-ion battery for further controlling the conduction of said controllable conductivity device to the reduced conductivity when the battery charging device for a nickel-cadmium battery is connected to said first pair of terminals.

55. The adapter of claim 54 wherein said latching circuit reduces the conductivity of said controllable conductivity device to reduce the charging current applied to the lithium-ion battery substantially to zero current when the voltage of the lithium-ion battery reaches a predetermined potential.

56. The adapter of claim 50 wherein said electronic circuit further comprises a pulsing circuit responsive to the limiting of the charging of the lithium-ion battery for repetitively and periodically applying a load between said first pair of terminals when a lithium-ion battery is connected to said second pair of terminals and a battery charging device for a nickel-cadmium battery is connected to said first pair of terminals.

57. An adapter for replacing an original nickel-cadmium battery with a replacement lithium-ion battery, said adapter comprising:
- a housing in a configuration substantially similar to that of an original nickel-cadmium battery, said housing having a cavity for receiving a lithium-ion replacement battery;
- a lithium-ion replacement battery in the cavity of said housing;
- said housing including a first pair of terminals in a configuration substantially similar to terminals of the original nickel-cadmium battery;
- said housing including a second pair of terminals electrically connecting to said lithium-ion replacement battery;
- a controllable conductivity device coupled between one of the first pair of terminals and one of the second pair of terminals, wherein said controllable conductivity device has a high conductivity when said lithium-ion replacement battery connected to said second pair of terminals is providing electrical power to a load connected to said first pair of terminals;
- a conductive connection between the other of said first pair of terminals and the other of said second pair of terminals; and
- a battery charging control circuit coupled to said second pair of terminals for sensing the voltage therebetween for controlling the conduction of the controllable conductivity device to a reduced conductivity for limiting the charging of said lithium-ion replacement battery connected to said second pair of terminals when a battery charging device is connected to said first pair of terminals.

58. The adapter of claim 57 wherein said battery charging control circuit reduces the charging current applied to said lithium-ion replacement battery substantially to zero current when the voltage of said lithium-ion replacement battery reaches a predetermined potential.

* * * * *